US009047568B1

(12) United States Patent
Fisher et al.

(10) Patent No.: US 9,047,568 B1
(45) Date of Patent: Jun. 2, 2015

(54) APPARATUS AND METHODS FOR ENCODING OF SENSORY DATA USING ARTIFICIAL SPIKING NEURONS

(71) Applicant: BRAIN CORPORATION, San Diego, CA (US)

(72) Inventors: Dimitry Fisher, San Diego, CA (US); Botond Szatmary, San Diego, CA (US); Eugene Izhikevich, San Diego, CA (US)

(73) Assignee: BRAIN CORPORATION, San Diego, CA (US)

( * ) Notice: Subject to any disclaimer, the term of this patent is extended or adjusted under 35 U.S.C. 154(b) by 392 days.

(21) Appl. No.: 13/623,820

(22) Filed: Sep. 20, 2012

(51) Int. Cl.
*G06N 5/02* (2006.01)
*G06N 3/04* (2006.01)

(52) U.S. Cl.
CPC .................................. *G06N 3/0472* (2013.01)

(58) Field of Classification Search
CPC ......................................................... G06T 5/007
USPC ............................................................. 706/25
See application file for complete search history.

(56) References Cited

U.S. PATENT DOCUMENTS

| 5,063,603 | A | 11/1991 | Burt |
| 5,138,447 | A | 8/1992 | Shen |
| 5,216,752 | A | 6/1993 | Tam |
| 5,272,535 | A | 12/1993 | Elabd |
| 5,355,435 | A | 10/1994 | DeYong |
| 5,638,359 | A | 6/1997 | Peltola |
| 5,673,367 | A | 9/1997 | Buckley |
| 5,875,108 | A | 2/1999 | Hoffberg |
| 6,009,418 | A | 12/1999 | Cooper |
| 6,014,653 | A | 1/2000 | Thaler |
| 6,035,389 | A | 3/2000 | Grochowski |
| 6,418,424 | B1 | 7/2002 | Hoffberg |
| 6,458,157 | B1 | 10/2002 | Suaning |

(Continued)

FOREIGN PATENT DOCUMENTS

| CN | 102226740 A | 10/2011 |
| JP | 4087423 | 3/1992 |

(Continued)

OTHER PUBLICATIONS

Simei Gomes Wysoski, Lubica Benuskova, Nikola Kasabov, Fast and adaptive network of spiking neurons for multi-view visual pattern recognition, Neurocomputing, vol. 71, Issues 13-15, Aug. 2008, pp. 2563-2575, ISSN 0925-2312, http://dx.doi.org/10.1016/j.neucom.2007.12.038.*

(Continued)

*Primary Examiner* — Stanley K Hill
*Assistant Examiner* — Ola Olude Afolabi
(74) *Attorney, Agent, or Firm* — Pillsbury Winthrop Shaw & Pittman LLP

(57) ABSTRACT

Sensory encoder may be implemented. Visual encoder apparatus may comprise spiking neuron network configured to receive photodetector input. Excitability of neurons may be adjusted and output spike may be generated based on the input. When neurons generate spiking response, spiking threshold may be dynamically adapted to produce desired output rate. The encoder may dynamically adapt its input range to match statistics of the input and to produce output spikes at an appropriate rate and/or latency. Adaptive input range adjustment and/or spiking threshold adjustment collaborate to enable recognition of features in sensory input of varying dynamic range.

25 Claims, 21 Drawing Sheets

(56) References Cited

U.S. PATENT DOCUMENTS

| | | |
|---|---|---|
| 6,509,854 B1 | 1/2003 | Morita |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,625,317 B1 | 9/2003 | Gaffin |
| 7,580,907 B1 | 8/2009 | Rhodes |
| 7,653,255 B2 | 1/2010 | Rastogi |
| 7,737,933 B2 | 6/2010 | Yamano |
| 7,849,030 B2 | 12/2010 | Ellingsworth |
| 8,000,967 B2 | 8/2011 | Taleb |
| 8,015,130 B2 | 9/2011 | Matsugu |
| 8,103,602 B2 | 1/2012 | Izhikevich |
| 8,160,354 B2 | 4/2012 | Paquier |
| 8,200,593 B2 | 6/2012 | Guillen |
| 8,311,965 B2 | 11/2012 | Breitwisch |
| 8,315,305 B2 | 11/2012 | Petre |
| 8,390,707 B2 | 3/2013 | Yamashita |
| 8,416,847 B2 | 4/2013 | Roman |
| 8,467,623 B2 | 6/2013 | Izhikevich |
| 2002/0038294 A1 | 3/2002 | Matsugu |
| 2003/0050903 A1 | 3/2003 | Liaw |
| 2003/0216919 A1 | 11/2003 | Roushar |
| 2004/0054964 A1 | 3/2004 | Bozdagi |
| 2004/0136439 A1 | 7/2004 | Dewberry |
| 2004/0170330 A1 | 9/2004 | Fogg |
| 2004/0193670 A1 | 9/2004 | Langan |
| 2005/0015351 A1 | 1/2005 | Nugent |
| 2005/0036649 A1 | 2/2005 | Yokono |
| 2005/0096539 A1 | 5/2005 | Leibig |
| 2005/0283450 A1 | 12/2005 | Matsugu |
| 2006/0094001 A1 | 5/2006 | Torre |
| 2006/0129728 A1 | 6/2006 | Hampel |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0100482 A1 | 5/2008 | Lazar |
| 2008/0174700 A1 | 7/2008 | Takaba |
| 2008/0199072 A1 | 8/2008 | Kondo |
| 2008/0237446 A1 | 10/2008 | Oshikubo |
| 2009/0043722 A1 | 2/2009 | Nugent |
| 2009/0287624 A1 | 11/2009 | Rouat |
| 2010/0036457 A1 | 2/2010 | Sarpeshkar |
| 2010/0081958 A1 | 4/2010 | She |
| 2010/0086171 A1 | 4/2010 | Lapstun |
| 2010/0100482 A1 | 4/2010 | Hardt |
| 2010/0166320 A1 | 7/2010 | Paquier |
| 2010/0225824 A1 | 9/2010 | Lazar |
| 2010/0235310 A1 | 9/2010 | Gage |
| 2010/0299296 A1 | 11/2010 | Modha |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0134242 A1 | 6/2011 | Loubser |
| 2011/0137843 A1 | 6/2011 | Poon |
| 2011/0160741 A1 | 6/2011 | Asano |
| 2011/0206122 A1 | 8/2011 | Lu |
| 2012/0011090 A1 | 1/2012 | Tang |
| 2012/0083982 A1 | 4/2012 | Bonefas |
| 2012/0084240 A1 | 4/2012 | Esser |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0151450 A1 | 6/2013 | Ponulak |
| 2013/0218821 A1 | 8/2013 | Szatmary |
| 2013/0251278 A1 | 9/2013 | Izhikevich |
| 2013/0297539 A1 | 11/2013 | Piekniewski |
| 2013/0297541 A1 | 11/2013 | Piekniewski |
| 2013/0297542 A1 | 11/2013 | Piekniewski |
| 2013/0325766 A1 | 12/2013 | Petre |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325777 A1 | 12/2013 | Petre |
| 2014/0012788 A1 | 1/2014 | Piekniewski |
| 2014/0016858 A1 | 1/2014 | Richert |
| 2014/0032458 A1 | 1/2014 | Sinyavskiy |
| 2014/0032459 A1 | 1/2014 | Sinyavskiy |
| 2014/0052679 A1 | 2/2014 | Sinyavskiy |
| 2014/0064609 A1 | 3/2014 | Petre |
| 2014/0122397 A1 | 5/2014 | Richert |
| 2014/0122398 A1 | 5/2014 | Richert |
| 2014/0122399 A1 | 5/2014 | Szatmary |
| 2014/0156574 A1 | 6/2014 | Piekniewski |

FOREIGN PATENT DOCUMENTS

| | | |
|---|---|---|
| RU | 2108612 C1 | 10/1998 |
| RU | 2406105 C2 | 12/2010 |
| RU | 2424561 C2 | 7/2011 |
| WO | 2008083335 A2 | 7/2008 |
| WO | 2008132066 A1 | 11/2008 |

OTHER PUBLICATIONS

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages, cwi ,n11-sbolltedmblica6ond)hdthesislxif>.

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.

Gewaltig et al., 'NEST (Neural Simulation Tool)', Scholarpedia, 2007, pp. 1-15, 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.

Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.

Izhikevich, 'Polychronization: Computation with Spikes', Neural Computation, 25, 2006, 18, 245-282.

(56) References Cited

OTHER PUBLICATIONS

Izhikevich, 'Simple Model of Spiking Neurons', IEEE Transactions on Neural Networks, vol. 14, No. 6, Nov. 2003, pp. 1569-1572.
Izhikevich et al., 'Relating STDP to BCM', Neural Computation (2003) 15, 1511-1523.
Karbowski et al., 'Multispikes and Synchronization in a Large Neural Network with Temporal Delays', Neural Computation 12, 1573-1606 (2000).
Khotanzad, 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Laurent, 'The Neural Network Query Language (NNQL) Reference' [retrieved on Nov. 12, 2013]. Retrieved from the Internet: <URL'https://code.google.com/p/nnql/issues/detail?id=1>.
Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1.
Nichols, A Re configurable Computing Architecture for Implementing Artificial Neural Networks on FPGA, Master's Thesis, The University of Guelph, 2003, pp. 1-235.
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Simulink.RTM. model [online], [Retrieved on Dec. 10, 2013] Retrieved from &It;URL: http://www.mathworks.com/ products/simulink/index.html>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Sztamary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371 %2Fjournal.pcbi.10008 79#>.
Paugam-Moisy et al. 'Computing with spiking neuron networks.' Handbook of Natural Computing, 40 p. Springer, Heidelberg (2009).
Lazar et al. 'Consistent recovery of sensory stimuli encoded with MIMO neural circuits.' Computational intelligence and neuroscience (2010): 2.
Lazar et al. 'Multichannel time encoding with integrate-and-fire neurons.' Neurocomputing 65 (2005): 401-407.
Cessac et al. 'Overview of facts and issues about neural coding by spikes.' Journal of Physiology, Paris 104.1 (2010): 5.
Wang 'The time dimension for scene analysis.' Neural Networks, IEEE Transactions on 16.6 (2005): 1401-1426.
Masquelier, Timothee. 'Relative spike time coding and Stop-based orientation selectivity in the early visual system in natural continuous and saccadic vision: a computational model.' Journal of computational neuroscience 32.3 (2012): 425-441.
Gollisch et al. 'Rapid neural coding in the retina with relative spike latencies.' Science 319.5866 (2008): 11 08-1111.
Dorval et al. 'Probability distributions of the logarithm of inter-spike intervals yield accurate entropy estimates from small datasets.' Journal of neuroscience methods 173.1 (2008): 129.
Sato et al., 'Pulse interval and width modulation for video transmission.' Cable Television, IEEE Transactions on 4 (1978): 165-173.
Lazar et al. 'A video time encoding machine', in Proceedings of the 15th IEEE International Conference on Image Processing (ICIP '08}, 2008, pp. 717-720.
Gluck, Stimulus Generalization and Representation in Adaptive Network Models of Category Learning [online], 1991 [retrieved on Aug. 24, 2013]. Retrieved from the Internet:<URL:http://www.google.com/url?sa=t&rct=j&q=Giuck+%22STIMULUS+GENERALIZATION+AND+REPRESENTATION+IN+ADAPTIVE+NETWORK+MODELS+OF+CATEGORY+LEARNING%22+1991.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Berkes et al., Slow feature analysis yields a rich repertoire of complex cell properties. Journal of Vision (2005) vol. 5 (6).
Field et al., Information Processing in the Primate Retina: Circuitry and Coding. Annual Review of Neuroscience, 2007, 30(1), 1-30.
Fiete et al. Spike-Time-Dependent Plasticity and Heterosynaptic Competition Organize Networks to Produce Long Scale-Free Sequences of Neural Activity. Neuron 65, Feb. 25, 2010, pp. 563-576.
Foldiak, Learning invariance from transformation sequences. Neural Computation, 1991, 3(2), 194-200.
Gerstner et al., (1996) A neuronal learning rule for sub-millisecond temporal coding. Nature vol. 383 (6595) pp. 76-78.
Hopfield, (1995) Pattern recognition computation using action potential timing for stimulus representation. Nature 376: 33-36.
Izhikevich et al., (2009) Polychronous Wavefront Computations. International Journal of Bifurcation and Chaos, 19:1733-1739.
Izhikevich, (2004) Which Model to Use for Cortical Spiking Neurons? IEEE Transactions on Neural Networks, 15:1063-1070.
Izhikevich, (2007) Dynamical Systems in Neuroscience: The Geometry of Excitability and Bursting, The MIT Press, 2007.
Janowitz et al., Excitability changes that complement Hebbian learning. Network, Computation in Neural Systems, 2006, 17 (1), 31-41.
Knoblauch et al. Memory Capacities for Synaptic and Structural Plasticity, Neural Computation 2009, pp. 1-45.
Masquelier et al., Learning to recognize objects using waves of spikes and Spike Timing-Dependent Plasticity. Neural Networks (IJCNN), The 2010 International Joint Conference on DOI-10.1109/IJCNN. 2010.5596934 (2010) pp. 1-8.
Meister, Multineuronal codes in retinal signaling. Proceedings of the National Academy of sciences. 1996, 93, 609-614.
Meister et al., The neural code of the retina, Neuron. 1999, 22, 435-450.
Oster et al., A Spike-Based Saccadic Recognition System. ISCAS 2007. IEEE International Symposium on Circuits and Systems, 2009, pp. 3083-3086.
Rekeczky et al., "Cellular Multiadaptive Analogic Architecture: A Computational Framework for UAV Applications." May 2004.
Revow et al., 1996, Using Generative Models for Handwritten Digit Recognition, IEEE Trans. on Pattern Analysis and Machine Intelligence, 18, No. 6, Jun. 1996.
Sanchez, Efficient Simulation Scheme for Spiking Neural Networks, Doctoral Thesis, Universita di Granada Mar. 28, 2008, pp. 1-104.
Schnitzer et al., Multineuronal Firing Patterns in the Signal from Eye to Brain. Neuron, 2003, 37, 499-511.
Serrano-Gotarredona et al, "On Real-Time: AER 2-D Convolutions Hardware for Neuromorphic Spike-based Cortical Processing", Jul. 2008.
Szatmary et al., (2010) Spike-Timing Theory of Working Memory. PLoS Computational Biology, 6(8): e1000879.
Thomas et al., 2004, Realistic Modeling of Simple and Complex Cell Tuning in the HMAX Model, and Implications for Invariant Object Recognition in Cortex, AI Memo 2004-017 Jul. 2004.
Thorpe, Ultra-Rapid Scene Categorization with a Wave of Spikes. In H.H. Bulthoff et al. (eds.), Biologically Motivated Computer Vision, Lecture Notes in Computer Science, 2002, 2525, pp. 1-15, Springer-Verlag, Berlin.

(56) References Cited

OTHER PUBLICATIONS

Thorpe et al., (2001). Spike-based strategies for rapid processing. Neural Networks 14, pp. 715-725.

Thorpe et al., (2004). SpikeNet: real-time visual processing with one spike per neuron. Neurocomputing, 58-60, pp. 857-864.

Van Rullen et al., Rate Coding versus temporal order coding: What the Retinal ganglion cells tell the visual cortex. Neural computation, 2001, 13, 1255-1283.

Van Rullen et al., (2003). Is perception discrete or continuous? Trends in Cognitive Sciences 7(5), pp. 207-213.

Van Rullen et al., (2005). Spike times make sense. Trends in Neurosciences 28(1).

Wallis et al., A model of invariant object recognition in the visual system. Progress in Neurobiology. 1997, 51, 167-194.

Wiskott et al., Slow feature analysis: Unsupervised learning of invariances. Neural Computation, 2002, 14, (4), 715-770.

Zarandy et al., "Bi-i: A Standalone Ultra High Speed Cellular Vision System", Jun. 2005.

Sjostrom et al., 'Spike-Timing Dependent Plasticity' Scholarpedia, 5(2):1362 (2010), pp. 1-18.

Florian03, Biologically inspired neural networks for the control of embodied agents, Technical Report Coneural-03-03 Version 1.0 [online], Nov. 30, 2003 [retrieved on Nov. 24, 2014]. Retrieved from the Internet: <URL:http://citeseerx.ist.psu.edu/viewdoc/download?doi=10.1.1.216.4931&rep1&type=pdf>.

* cited by examiner

APPARATUS AND METHODS FOR ENCODING OF SENSORY DATA USING ARTIFICIAL SPIKING NEURONS

CROSS-REFERENCE TO RELATED APPLICATIONS

This application is related to co-owned and co-pending U.S. patent application Ser. No. 13/151,477 entitled "RETINAL APPARATUS AND METHODS", filed Jun. 29, 2012; U.S. patent application Ser. No. 13/540,429 entitled "SENSORY PROCESSING APPARATUS AND METHODS", filed Jul. 2, 2012; and U.S. patent application Ser. No. 13/623,838 entitled "SPIKING NEURON NETWORK APPARATUS AND METHODS FOR ENCODING OF SENSORY DATA", filed herewith, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates generally to artificial visual systems and more particularly in one exemplary aspect to computer apparatus and methods for implementing spatial encoding in artificial retina.

2. Description of Related Art

Various existing implementations of artificial retinal functionality aim at converting visual input (e.g., frames of pixels) to output signals of different representations, such as: spike latency, see for example, U.S. patent application Ser. No. 12/869,573, filed Aug. 26, 2010, entitled "SYSTEMS AND METHODS FOR INVARIANT PULSE LATENCY CODING", and U.S. patent application Ser. No. 12/869,583, filed Aug. 26, 2010, entitled "INVARIANT PULSE LATENCY CODING SYSTEMS AND METHODS SYSTEMS AND METHODS"; polychronous spike trains, see for example, U.S. patent application Ser. No. 13/117,048, filed May 26, 2010, entitled "APPARATUS AND METHODS FOR POLYCHRONOUS ENCODING AND MULTIPLEXING IN NEURONAL PROSTHETIC DEVICES", current output, see for example, U.S. patent application Ser. No. 13/151,477, entitled "RETINAL APPARATUS AND METHODS" filed Jun. 29, 2012, each of the foregoing incorporated herein by reference in its entirety.

Artificial retinal apparatus (e.g., the apparatus described in U.S. patent application Ser. No. 13/152,119, Jun. 2, 2011, entitled "SENSORY INPUT PROCESSING APPARATUS AND METHODS", incorporated herein by reference in its entirety) attempt to mimic particular spatial characteristics (horizontal connectivity) of natural retina cone cells, such as two-dimensional "difference-of-Gaussians" (DoG) spatial filter profile, and a difference filter in the temporal domain. In order to improve response to contrast changes and facilitate detection of edges, existing artificial retina implementations implement difference-of-Gaussians" spatial filter profile in the ganglion later (RGCs). Typically, the centers of the RGCs are arranged spatially as a two-dimensional (2-D) or a 3-dimensional (3D) structure, such as a linear array, a rectangle, square, or honeycomb pattern. The spatial extents of the RGCs, in terms of the input image pixels, may overlap with multiple neighboring RGCs.

It is often desirable, in, for example, retinal implant applications, to be able to reproduce various features (e.g., trichromatic vision, multiple levels of spatial and/or temporal resolution. Furthermore, it may be desirable to provide visual encoding apparatus that may be optimally configured (e.g., comprise different types of encoder neurons) for different applications, using the same general architecture.

In some applications, it may be beneficial to peorm data compression by utilizing conversion of real-valued (e.g., continuous and/or discrete with variable bit-length) signals into spike output.

Accordingly, there is a salient need for an improved apparatus and methods for encoding of visual data into spike output using spiking neuron networks.

SUMMARY

The present disclosure satisfies the foregoing needs by providing, inter alia, apparatus and methods for implementing continuous spatial connectivity in artificial retina.

One aspect of the disclosure relates to a computer-implemented method of generating a response by a spiking neuron visual encoder apparatus. The method may be performed by one or more processors configured to execute computer program modules. The method may comprise scaling excitability of the spiking neuron based on a value of a statistical parameter of visual input; adjusting scaled excitability of the spiking neuron in accordance with the visual input; comparing the adjusted excitability to a threshold; and, responsive to the adjusted excitability breaching the threshold, generating the response and adjusting the threshold.

In some implementations, the response may comprise a plurality of spikes characterized by a spike rate. The scaling and the adjusting may be configured to generate the spike rate consistent with the visual input.

In some implementations, the response may comprise at least one spike characterized by a spike latency. The scaling and the adjusting may be configured to generate the spike latency consistent with the visual input.

In some implementations, the statistical parameter may be determined based at least on input within an interval prior to occurrence of the response. The statistical parameter may be capable of characterizing variance of the input within the interval.

In some implementations, the method may further comprise generating another response based on another photodetector input. The other photodetector input may be characterized by another value of the statistical parameter configured to scale the other input. The other response may be characterized another spike rate. When the other value is lower than the value, the other spike rate may be lower than the spike rate, which may effectuate the generation of the spike rate consistent with the photodetector input.

In some implementations, when the other value is greater than the value, the other spike rate may be greater than the spike rate, which may effectuate the generation of the spike rate consistent with the photodetector input.

In some implementations, the scaling may comprise multiplying the excitability by a factor based on the statistical parameter.

In some implementations, the neuron response may comprise a plurality of spikes characterized by a spike rate. The visual input may comprise a bit stream characterized by first portion having first time scale associated therewith and second portion having second time scale associated therewith. The second time scale may be at least twice longer than the first time scale. The statistical parameter may comprise variance determined based on the second portion.

In some implementations, the spike rate may be characterized by an inter-spike interval. The second time scale may comprise a plurality of the inter-spike interval.

In some implementations, the inter-spike interval may be selected from the range between 1 ms and 1000 ms, inclusive. The second time scale may selected from the range between 2 s and 10 s, inclusive.

In some implementations, the neuron response may comprise at least one spike characterized by a spike latency. The visual input may comprise a bit stream characterized by first portion having first time scale associated therewith and second portion having second time scale associated therewith. The second time scale may be at least twice longer than the first time scale. The statistical parameter may comprise a variance determined based on the second portion.

In some implementations, adjusting the threshold may comprise a proportional adjustment effectuated by modifying the threshold by a scale factor.

In some implementations, adjusting the threshold may comprise an incremental adjustment effectuated by modifying the threshold by an increment value.

Another aspect of the disclosure relates to an image compression apparatus. The apparatus may comprise an interface, one or more spiking neurons, an adjustment block, a processing block, a scaling block, and a response block. The interface may be configured to receive a graded image data at an input time. The one or more spiking neurons may be operable in accordance with a dynamic process characterized by an excitability characteristic configured to determine neuron response based on the image data. The one or more neurons may be configured to implement one or more of the adjustment block, the processing block, the scaling block, or the response block. The adjustment block may be configured to modify a response generation threshold based on the neuron response being generated. The processing block may be configured to determine a parameter associated with one or more image data received over a time period prior to the input time. The scaling block may be configured to scale the image data based on a statistical parameter. The response block may be configured to generate the neuron response responsive to the excitability characteristic breaching the threshold. The neuron response may comprise one or more spikes. Scaling and modifying may cooperate to compress the data into the one or more spikes.

In some implementations, the adjustment block may be configured to modify the response generation threshold based on the at least a portion of graded image data.

In some implementations, the graded image data may comprise a plurality of pixels. Individual ones of the plurality of pixels may be characterized by three or more bits of resolution/dynamic range. The data may be characterized by a first data rate. The neuron response may comprise a compressed output characterized by a second data rate. The second data rate may be lower than the first data rate.

In some implementations, the one or more spikes may be characterized by a spike rate. The statistical parameter may comprise variance determined from the one or more image data. The scaling may comprise dividing a value associated with individual ones of the plurality of pixel by a factor determined based on the statistical parameter.

In some implementations, the factor may comprise the statistical parameter additively combined with a limit value.

In some implementations, the one or more spikes may comprise a binary bit-stream. The graded image data may comprise an N-ary bit-stream with N greater than two.

In some implementations, the statistical parameter may be capable of characterizing variance of the input at least within the time period.

In some implementations, the statistical parameter may comprise a history of a variance of the one or more image data determined based on a solution of an integral equation configured to describe time-dependence of the variance over the time period.

Yet another aspect of the disclosure relates to a computerized data processing system. The system may comprise one or more processors configured to execute computer program modules. Execution of the computer program modules may cause the one or more processors to implement a spiking neuron network that is configured to encode multi-bit data into binary output by: evaluating statistics of the multi-bit data; scaling a portion of the multi-bit data based on the statistics; adjusting network state based on the scaled input; and generating the binary output based on a comparison of the adjusted state with a threshold. The binary output may be characterized by a lower bit-rate compared to the multi-bit input.

In some implementations, the multi-bit data may comprise analog data characterized by three or more bits of dynamic range. The binary output may comprise one or more spikes characterized by two bits of dynamic range.

In some implementations, the multi-bit data may comprise one or more pixels associated with a digital image. Individual ones of the one or more pixels may be characterized by three or more bits of dynamic range.

In some implementations, the binary output may comprise one or more spikes. Individual ones of the one or more spikes may be characterized by a binary one bit value.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
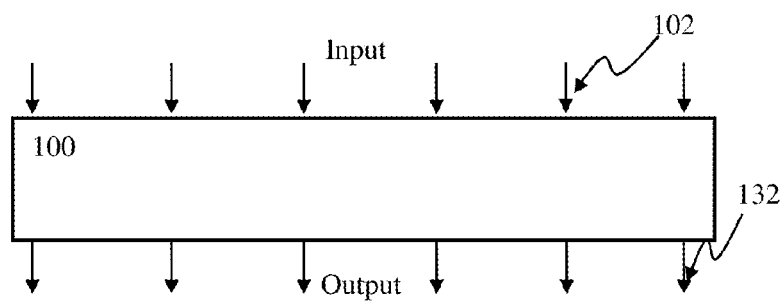
FIG. 1 is a block diagram illustrating a generalized architecture of the sensory encoder apparatus in accordance with implementation.

All Figures disclosed herein are © Copyright 2012 Brain Corporation. All rights reserved.

DETAILED DESCRIPTION

Implementations of the present disclosure will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device", include, but are not limited to, personal computers (PCs) and minicomputers, whether desktop, laptop, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, and/or other devices capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), object-oriented environments such as the Common Object Request Broker Architecture (CORBA), Java™ (e.g., J2ME, Java Beans), Binary Runtime Environment (e.g., BREW), and/or other programming languages and/or environments.

As used herein, the terms "connection", "link", "transmission channel", "delay line", "wireless" means a causal link between any two or more entities (whether physical or logical/virtual), which enables information exchange between the entities.

As used herein, the terms "graded signal", "continuous signal", "real-world signal", "physical signal" may describe a non-spiking signal (either analog or non-binary discrete). A non-spiking signal may comprise three or more distinguishable levels.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other storage media.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, or software interface with a component, network or process including, without limitation, those of the FireWire (e.g., FW400, FW800), USB (e.g., USB2), Ethernet (e.g., 10/100, 10/100/1000 (e.g., Gigabit Ethernet), 10-Gig-E), MoCA, Coaxsys (e.g., TVnet™), radio frequency tuner (e.g., in-band or OOB, cable modem), Wi-Fi (e.g., 802.11), WiMAX (e.g., 802.16), PAN (e.g., 802.15), cellular (e.g., 3G, LTE/LTE-A/TD-LTE, GSM), IrDA families, and/or other network interfaces.

As used herein, the terms "pixel" and "photodetector", are meant generally to include, without limitation, any type of photosensitive circuit and/or device adapted for converting light signal (e.g., photons) into electrical form (e.g., current and/or voltage) and/or digital representation.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and/or any other pulse and/or pulse type associated with a discrete information transmission system and/or mechanism.

As used herein, the terms "pulse latency", "absolute latency", and "latency" are meant generally to refer to, without limitation, a temporal delay and/or a spatial offset between an event (e.g., the onset of a stimulus, an initial pulse, and/or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the terms "relative pulse latencies" refer to, without limitation, a latency pattern or distribution within a group (or pattern) of pulses that is referenced with respect to the pulse group latency.

As used herein, the term "pulse-code" is meant generally to denote, without limitation, information encoding into a patterns of pulses (or pulse latencies) along a single pulsed channel or relative pulse latencies along multiple channels.

As used herein, the term "synaptic channel", "connection", "link", "transmission channel", "delay line", and "communications channel" are meant generally to denote, without limitation, a link between any two or more entities (whether physical (wired or wireless), or logical/virtual) which enables information exchange between the entities, and is characterized by a one or more variables affecting the information exchange.

As used herein, the term "Wi-Fi" refers to, without limitation, any of the variants of IEEE-Std. 802.11, related standards including 802.11 a/b/g/n/s/v, and/or other wireless standards.

As used herein, the term "wireless" means any wireless signal, data, communication, or other interface including without limitation Wi-Fi, Bluetooth, 3G (e.g., 3GPP/3GPP2), HSDPA/HSUPA, TDMA, CDMA (e.g., IS-95, WCDMA), FHSS, DSSS, GSM, PAN/802.15, WiMAX (e.g., 802.16), 802.20, narrowband/FDMA, OFDM, PCS/DCS, LTE/LTE-A/TD-LTE, analog cellular, CDPD, satellite systems, millimeter wave or microwave systems, acoustic, infrared (e.g., IrDA), and/or other wireless interfaces.

Apparatus and methods for implementing sensory encoder. The encoder may comprise spiking neuron network operable in accordance with a dynamic spike response process (SRP). The process may be characterized by a response generation threshold (firing threshold). In order to control neuron output rate, the firing threshold may be adaptively adjusted whenever a neuron generates response (fires a spike).

As in biological retinas, the visual sensory signal encoder may take a continuous time signal like the photonic flux reaching the sensor and encode it into binary spike events. Binary spike events encode information in their inner spike intervals, the same as in the biological retina. This encoding scheme allows much greater information carrying capacity than clock-based representations, with much lower transmission power and signal fidelity requirements. The algorithms presented in this patent describe a biologically plausible model of encoding a continuous light or photonic flux signal into a discrete spike time signal, with the aforementioned benefits.

When uses with digitized sensory data (e.g., digital images) the encoder may receive a stream of graded (e.g., multibit resolution) RGB values and encode these into spikes (binary bit stream). Such encoding advantageously reduces output bit rate facilitates data compression.

The spike response process may further comprise adaptive adjustment mechanism configured to match neuron excitability to input signal levels. In some implementations, the adaptive mechanism may comprise scaling the input by a time-history of input variance determined over the preceding time period. In one or more implementations, the adaptation may comprise scaling the neuron input range (excitability) by the input variance time history.

Realizations of the innovation may be for example deployed in a hardware and/or software implementation of a neuromorphic computerized system.

Detailed descriptions of various implementations of the apparatus and methods of the disclosure are now provided. Although certain aspects of the innovation can best be understood in the context of artificial retina, the principles of the disclosure are not so limited and implementations of the disclosure may also be used for implementing visual processing in, for example, a robotic systems, surveillance cameras, and/or handheld communications devices. In one such implementation, a robotic system may include a processor embodied in an application specific integrated circuit, which can be adapted or configured for use in an embedded application (such as a prosthetic device).

One implementation of a sensory encoder apparatus is illustrated in FIG. 1. The apparatus 100 may be configured to receive sensory input 102 and to encode the input 102 into spike output 132. In some implementations of visual encoding, the input 102 may comprise light input, e.g., provided by a camera lens or natural light entering retinal implant. In one or more implementations of digital image encoding, the input may comprise output of an array of charge coupled devices (CCD), or an active-pixel sensor (APS). In one or more implementations, the input may comprise a digital input stream of red, green blue RGB integer values, fixed-point or floating-point real values, refreshed at a suitable frame rate, e.g. 1-10000 Hz. It will be appreciated by those skilled in the art that the above digital stream image parameters are merely exemplary, and many other image representations (e.g., bit-map, luminance-chrominance (YUV, YCbCr), cyan-magenta-yellow and key (CMYK), grayscale, and/or other image representations) are equally applicable to, and useful with, the present disclosure. Furthermore, data frames corresponding to other (non-visual) signal modalities such as sonogram, radar, seismographs, or tomography images are equally compatible with the general architecture shown in FIG. 1.

In some implementations, the input may comprise bi-phasic structure, e.g., comprise a positive phase and a negative phase. In some implementations, the bi-phasic input may be obtained by removing a constant level (e.g., mean, or median) from the input.

In one or more implementations, the bi-phasic input may be obtained by emulating response functionality of the biological retinal bipolar cells. In some implementations, the response emulation may be achieved by convolving the input with a bi-phasic temporal filter. In some implementations, the response emulation may be achieved by convolving the input with a center-surround spatial filter. In one or more implementations, input into the surround may be delayed and/or low-pass-filtered relatively to the center input.

Figure 2A:
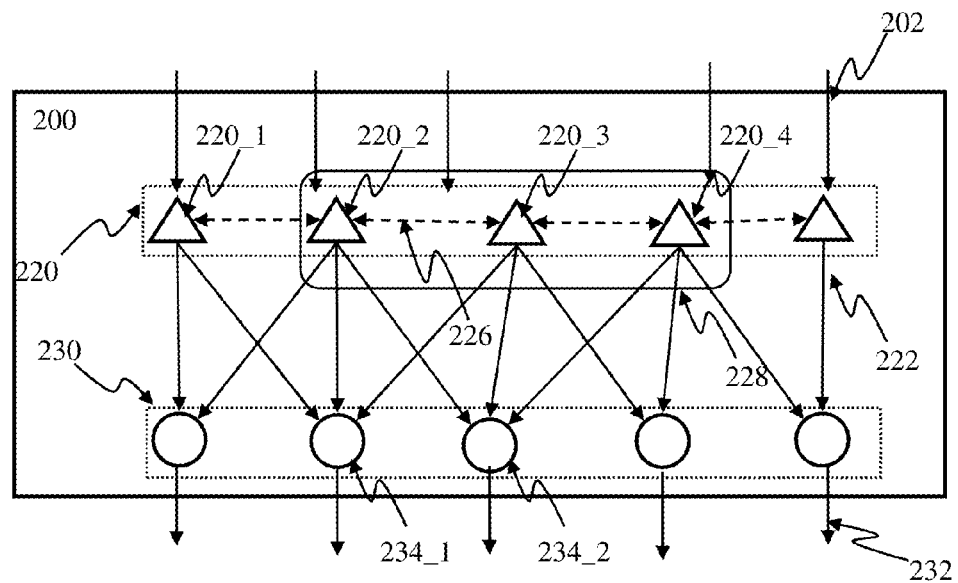
FIG. 2A is a block diagram illustrating sensory encoder apparatus comprising a photoreceptive block and an encoder block in accordance with one implementation.

Referring now to FIG. 2A, detail structure of the sensory encoder apparatus 200 (e.g., the apparatus 100 of FIG. 1) is illustrated in accordance with one implementation of the disclosure.

The apparatus 200 may comprise photoreceptive (cone) block 220 and encoding (neuron) block 230. The cone block may be configured in accordance with the diffusive coupling methodology (depicted by broken lines 226 in FIG. 2A) and described in detail pending U.S. patent application Ser. No. 13/151,477, entitled "RETINAL APPARATUS AND METHODS" filed Jun. 29, 2012, incorporated supra.

In some implementations, the encoding block may comprise spiking neuron network, illustrated by broken line rectangle denoted 230 in FIG. 2A. The encoding block 230 may receive photoreceptor output via connections 222. In some implementations, the connections 222 may comprise connection weights, configured to adapt input types to the encoder unit type, as described below with respect to FIG. 2B.

In some implementations of digitized image processing, the photoreceptive layer may comprise a virtual layer comprised of a plurality of image pixels. In such implementations, and the connections 222 may comprise virtual connections effectuated via, for example, memory addressing.

Individual units 234 of the network may receive input from one or more photoreceptors, such as the unit 234_1 may receive input from the photoreceptors 220_1, 220_2, 220_3 and the unit 234_2 may receive input from the photoreceptors 220_2, 220_3, 220__3 and so on, as illustrated in FIG. 2A. The area of the photoreceptive layer (e.g., the layer 220 in FIG. 2A) corresponding to the photoreceptors providing input for a particular encoding unit (e.g., the unit 220_2 in FIG. 2A) may be referred to as the "circle of confusion", as depicted by a curve denoted 228 in FIG. 2A.

Figure 2B:
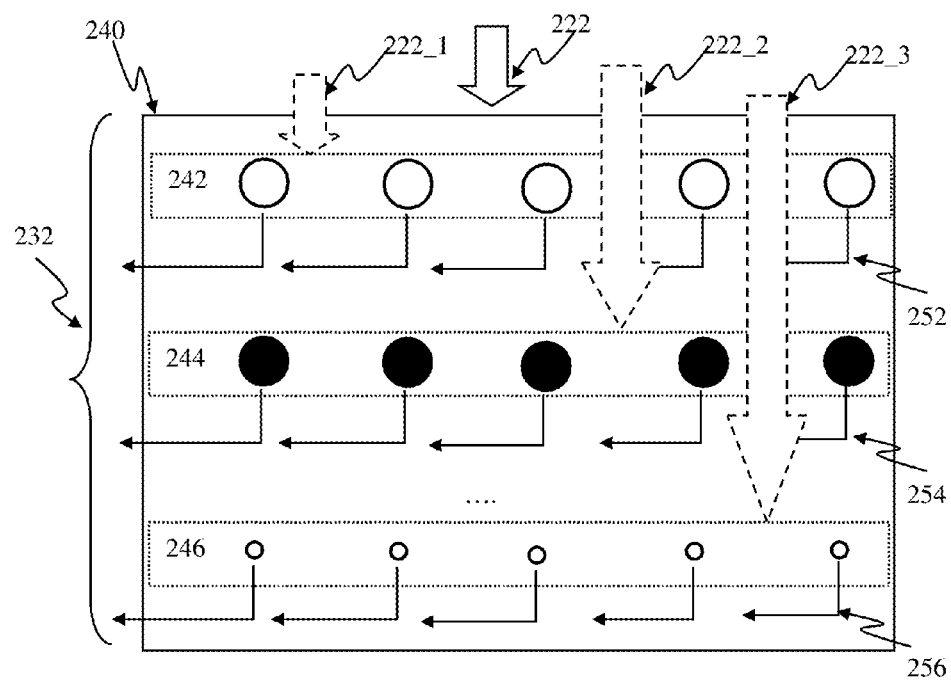
FIG. 2B is a block diagram illustrating encoder block of FIG. 2B comprising multiple neuron types arranged in layers, in accordance with implementation.

The network of the encoder block 230 may comprise one (or more) unit types, as illustrated in FIG. 2B. The block 240 of FIG. 2B comprises three unit types arranged into separate layers 242, 244, 246 may receive the input 222 and may generate layer output 252, 254, 256. The output of individual layers may be combined to produce encoded output 232.

The input into deferent unit layers (e.g., the layers 242, 244, 246) may comprise different input channels 222_1, 222_2, 222_3. In one or more implementation of providing input comprising more than one component (e.g., wavelength), the channels 222_1, 222_2, 222_3 may comprise connection weights, configured to assign input components to appropriate encoder layers. By way of example of encoding retinal input, comprising L and M (long and medium wavelength, respectively) components, weights of the connections 222_1 may be used to provide input I=L+M to the parasol unit layer 242. Similarly, weights of the connections 222_2 may be used to provide input I=L−M to the red midget unit layer 242. When encoding, digitized images (e.g., a stream of RGB pixels) the input 222 may be decomposed into individual red/green/blue sub-channels 222_1, 222_2, 222_3, as shown in FIG. 2B. In some implementations, the total input 22 may be delivered to all encoder layers (e.g., the layers 242, 244, 246) and the component separation may be implemented by the encoder units via any appropriate methodologies (e.g., filtering, address decoding, stream parsing, etc.)

Unit types of different layers (e.g., the layers 242, 244, 246) may be configured to encode the input 222 based on one or more of characteristics, associated with the unit response process. In some implementations, the response characteristic may comprise a spectral density parameter (e.g., wavelength). The spectral density parameter may be utilized to enable units of a particular type to respond to input of the appropriate direction or region in the color space (e.g. units sensitive to yellow-blue contrast, red-green contrast, and/or luminance). In some implementations, the response characteristic may comprise a spatial response, and/or a temporal response. In some implementations, the temporal response may be based on a high-pass, band-pass, and/or low-pass temporal filter. In one or more implementations, the spatial response may be configured based on a circular, and/or an asymmetric center-only or center-surround spatial filter. In some implementations, the response characteristic may comprise an output spike generation parameter describing spike duration, frequency, inter spike period, and/or other response characteristics. The inter spike period may be associated with a tonic response, bursting response, and/or other responses.

In some implementations, the encoder layers (e.g., the layers 242, 244, 246) may comprise Parasol Units (PU) and/ or Midget Units (MU), configured to approximate behavior of natural retina RGC midget cells (MC) and parasol cells (PC), respectively.

In one or more implementations, other unit type may be used to implement functionality supported by small bi-stratified cells (SBC) of neuroretina (SBCU). In some implementations, the network of the encoder block may be configured to comprise on- and off-SBCUs. In some implementations, the network may be configured to comprise blue-OFF center channel handled by the midget units and blue-ON center by the SBCUs.

The encoder block may comprise units of different types may in various proportions. In one implementation, there may be approximately 9 times as many MUs compared to PUs. In some implementations, the encoder block (e.g., the block 330) may comprise a single unit type (either MU or PU or another).

Figure 3:
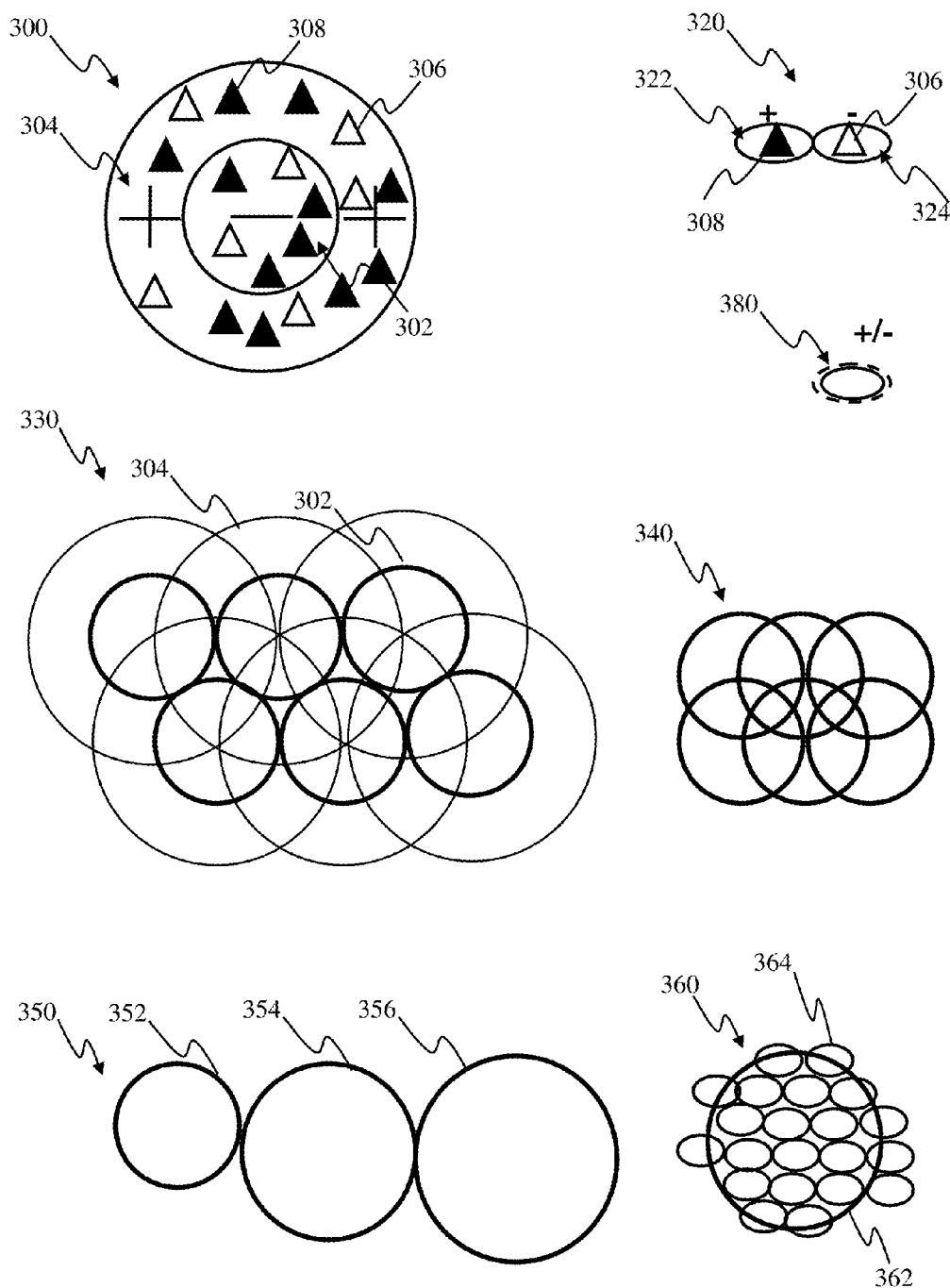
FIG. 3 is a graphical illustration depicting spatial configuration and responses of different unit types for use with the encoder of FIG. 2B, in accordance with one or more implementations.

FIG. 3 illustrates several exemplary implementations of the parasol and midget encoder unit spatial responses. The parasol unit response 300 comprises a center area 302 and a surround area 304. The center and the surround areas may be configured to respond to opposing input stimuli. In some implementations, the center area may respond to input intensity (brightness) that his higher than the average image brightness (also referred to as the "on-center), while the surround area may respond to input brightness that his lower than the average (also referred to as the "off-surround"). Similarly, as illustrated in FIG. 300, the center area 302 (denoted with the '-' sign) may respond to the input brightness that his lower than the average ("off-center") while the surround area 304 may respond to input brightness that his higher than the average (also referred to as the "on-surround"). The center area 302 may respond to visual input (e.g., from image pixels and/or cones) that have lower intensity (depicted by the white triangles 306), while the surround area 304 may respond to higher intensity input, depicted by black triangles 308 in FIG. 3. The center area of the parasol may be large enough to receive input from several pixels/cones, between 4 and 20 in some implementations. The surround may be of a similar size as the center area in some implementations. In one or more implementations the surround area may be 3-30 times larger than the center area.

In some implementations, two types of PUs may be implemented: (i) the on-center PUs that may respond preferentially for a change from weak (e.g., dark) to strong (e.g., bright) center stimuli (or from bright to dark surround stimuli); and (ii) the off-center PUs that may respond preferentially for the exact opposite stimuli.

One implementation of the midget unit spatial response is given by the panel 320. The MU response 320 comprises an on-lobe 322 and an off-lobe 324 arranged in a dipole configuration. The parasol units may be configured to comprise spatially larger receptive fields (compared to the MUs). In one implementation, such larger receptive fields may be effectuated by pooling responses from multiple units of the photoreceptive layer. Compared to the parasol response lobes 302, 304 the size of the midget response lobes 322, 324 is smaller encompassing typically 1-2 cones, in some implementations.

In one or more implementation, the MU on-lobe 322 and the off-lobe 324 may be arranged in a co-axial configuration, illustrated in the panel 380 in FIG. 3.

The parasols of the encoder layer (e.g., the layer 242 in FIG. 2B) may comprise a tiled layout, with non-overlapping centers of their receptive fields, as illustrated by the panel 330 in FIG. 3, according to one implementation. In one or more implementations, the parasol receptive may be configured to overlap, as depicted by the panel 340 of FIG. 3.

In some implementations, encoder unit of a given type may comprise receptive fields of different sizes, as shown, for example, in the implementation of panel 350 of FIG. 3. The circles 352, 354, 356 may denote, for example, parasol center receptive field.

In one or more implementations, units of different encoder layers (e.g., the layers 242, 244, 246 of FIG. 2) may comprise overlapping tiled configurations, as illustrates in the panel 360 depicting a single the center of the PU receptive field 362 and multiple MU receptive fields 364.

Figure 4:
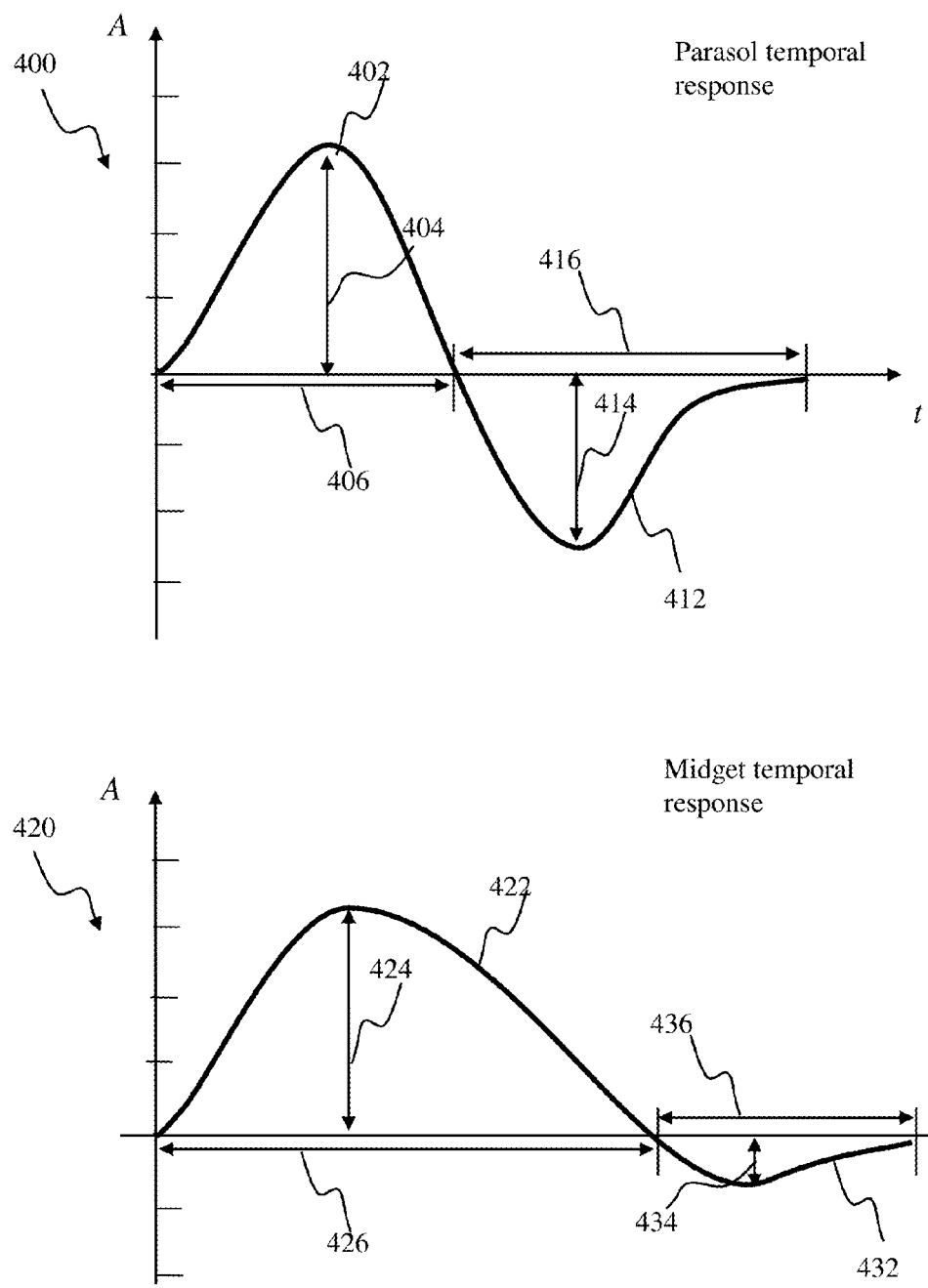
FIG. 4 is a plot illustration temporal response of parasol unit and midget unit of the encoder network according to one or more implementations.

Temporal response of parasol and midget units is illustrated in FIG. 4, according to one implementation. The parasol response, shown in panel 400, may comprise positive 402 and a negative lobe 412. The MU response, illustrated by the panel 420 in FIG. 4, also may comprise a positive 422 and a negative 432 lobes. However, the width of the positive lobe 426 may be typically more than twice the width of the negative lobe 436, while the maximum positive response amplitude 424 may be substantially greater (2-5 times in some implementations) than the maximum negative response amplitude 434. In one or more implementations, the PU may be characterized by a fast bi-phasic response, while MU may be characterized by a more sustained response.

In some implementations, the midget and parasol units may differ in their input connectivity and/or in the filtering of the input they receive from the model cone units.

Figure 4A:
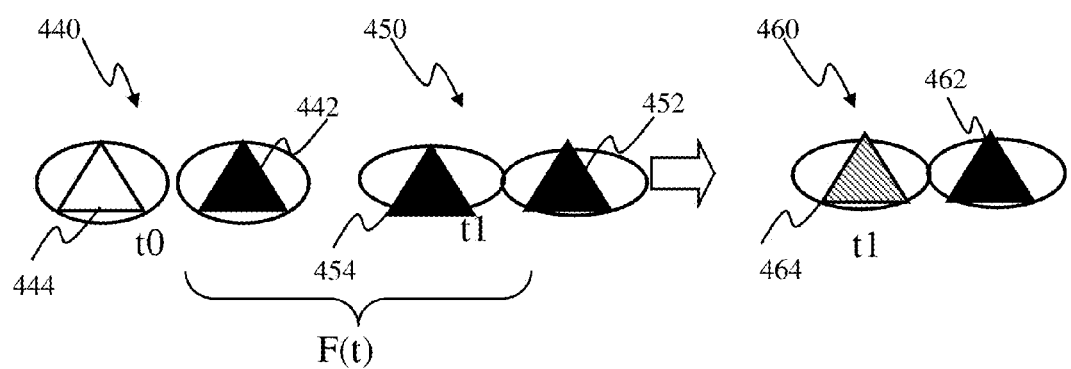
FIG. 4A is a plot illustration temporal averaging by a midget unit of the encoder network according to one implementation.

FIG. 4A illustrates one implementation of temporal filtering by the MUs. The panels 440, 450 depict MU receptive fields comprising 'on' 444, 452, 454 and an 'off' stimulus 442, presented to the MU at times t0, t1 respectively. The MU of FIG. 4A is configured to implement a temporal averaging filter (e.g., exponential, Gaussian, running mean, etc.). Accordingly, the output of the MU at time t1 may comprise an average of the inputs 444, 454 and 442, 452, indicated by shaded triangle 464 and black triangle 462, respectively, in FIG. 4A.

Figure 4B:
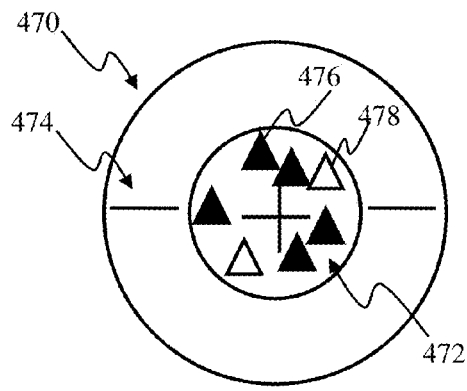
FIG. 4B is a plot illustration spatial averaging by a parasol unit of the encoder network according to one implementation.

FIG. 4B illustrates one implementation of spatial filtering by the PUs. The panels PU receptive field 470 comprises on-center portion 472 and off-center surround 474. In some implementations, the PU response may be configured based on a linear combination of individual pixel/photoreceptor stimuli within the center and/or surround portions of the receptive field (e.g., the portions 472, 474). In on implementation, the linear combination may be determined using a weighted average of the dark and/or light stimuli denote by black and white triangles 476, 478, respectively, in FIG. 4B) as:

$$I = \Sigma_i a_i f_i \quad \text{(Eqn. 1)}$$

where the weights $a_i$ may be configured according to the difference-of-Gaussians (DoG) spatial profile. Accordingly, the receptive field (RF) of the PU in this implementation may be characterized by the spatial DoG form. Similarly, input stimulus associated with the surround portion of the PU RF may be determined based on a combination of individual pixel/photoreceptor stimuli within the surround portion (not shown).

In some implementations, the input I may be provided by a diffusively coupled photodetector layer, such as described in pending U.S. patent application Ser. No. 13/151,477, entitled "RETINAL APPARATUS AND METHODS", incorporated supra. As described in the above-referenced application, the individual cone output $f_i$ comprised high-pass filtered signal.

In some implementations, the input I may comprise digitized pixel stream $f_i$. Accordingly, the input may be passed through a high-pass filter configured to remove low (near-DC) frequency content.

In some implementations, the tonic character of the MUs response may be effectuated by, at least partly, low-pass filtering (in time) their input. In one or more implementations, the tonic character of the midget unit response may be effectuated by higher sensitivity of the MUs to weaker stimuli that is achieved by renormalizing their input using input variance.

In one or more implementations, the parasol and the midgets units may be configured to comprise spatio temporal characteristics of a biological RGC layer. In some implementations, the MUs may be characterized by spatially smaller receptive fields, relative to the PUs. The spatial dimensions of the receptive fields of the midget units may be adjusted by controlling parameters of the diffusive process within the photoreceptive layer (e.g., as described in detail in U.S. patent application Ser. No. 13/540,429 entitled "SENSORY PROCESSING APPARATUS AND METHODS", incorporated supra).

In some implementations, lateral connections between the RGCs may contribute to their response, particularly to the surround stimulation.

In some implementations, the prolonged (tonic) response of the MUs may be configured based at least in part on their time-integral properties, where the MU response may be configured based on a time integral of the MU input. The PUs may be configured to produce more brief (or phasic) response and may be more sensitive to rapid changes in brightness and less sensitive to slow or sustained changes, compared to the PUs. Time course of the PU response may be closely augmented by the time course of the cone response.

The PUs and MUs may be configured to implement center-surround opponency of their receptive field, as explained above. Such configuration of the midget and the parasol units, may be suited for detecting coherence in the input signal with the MUs being more sensitive to slower motion and the PUs being more sensitive to faster motion of objects in the visual scene.

In some implementations, the PUs may be configured to receive same strength input from L and M cones, whereas MUs may receive opposite input from L and M cones. By way of background, three types of cone photoreceptors exist in mammalian retina: L, M, and S, sensitive to Long, Medium, and Short wavelengths of the visible light. In some implementations, the input into the encoder units (e.g., MUs, PUs) may comprise stimulus from one or more types of photoreceptors. The photoreceptors may be characterized by a specific spectral and or other operation parameters configured in accordance with application.

Thus PUs may be sensitive primarily to changes in brightness. The MUs may be also sensitive to red vs. green chromaticity. In one or more implementations, the S-cone inputs (blue) may be either handled by a special class of MUs or by a different class of RGCs (small bi-stratified cells (SBCs)) altogether. In some implementations, yellow-blue chromaticity may be described as (L+M)/2 vs. S cone input opponency.

In one or more implementations, the spike generation mechanism used by the PUs and/or MUs may comprise log-encoding of spike latency as described, for example, in a co-owned U.S. patent application Ser. No. 12/869,573, entitled "SYSTEMS AND METHODS FOR INVARIANT PULSE LATENCY CODING", and No. U.S. patent application Ser. No. 12/869,573, entitled "INVARIANT PULSE LATENCY CODING SYSTEMS AND METHODS SYSTEMS AND Methods", each of the foregoing incorporated herein in its entirety.

Figure 5:
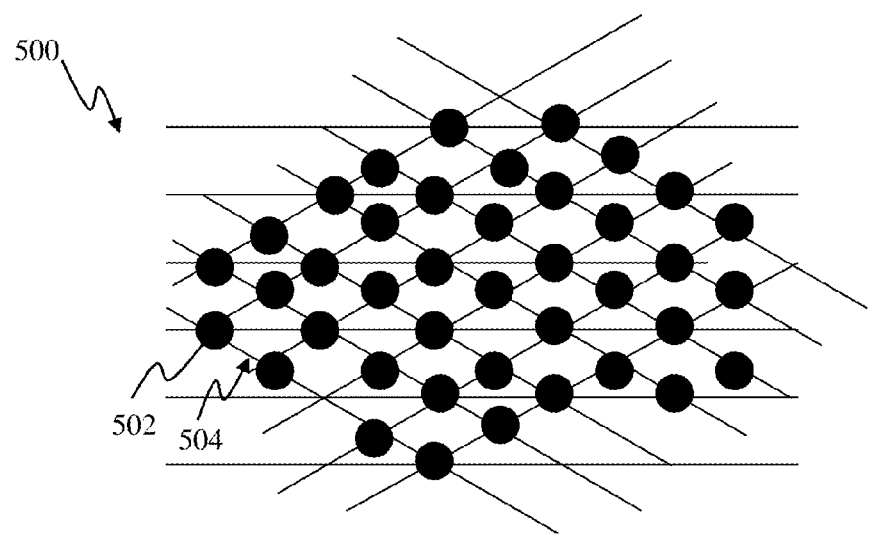
FIG. 5 is a graphical illustration depicting a hexagonal grid for use with encoder units of FIG. 3, in accordance with one implementation.

As illustrated by FIG. 5, units of individual types (e.g., units 502) may be placed on a grid. In some implementations, the hexagonal grid 500 comprises multiple units 502 of the same type thereby forming a single encoding later (e.g., the layer 242, 244, 246) of the encoder 240 of FIG. 2. Consequently, the encoder may comprise two or more grids in order to support units of two or more types. In some implementations, the location of the units on the grid may be jittered', i.e., comprise a random position component dr determined, for example, as follows:

$$\Delta r = pr \qquad (Eqn. 2)$$

where:
r is a nominal node-to node distance (e.g., the distance 504 in FIG. 5) and
p is a random number selected from the range [0. 1], in one implementation.

In some implementations, the grid may comprise rectangular, jittered rectangular, random, etc., with and/or without periodic boundary conditions (torus surface topology). In one or more implementations configured to characterize natural retina encoding, the number of MUs may exceed the number of PUs by a factor between 2-30 times more, depending on the specific application and/or on the region of the retina that is characterized.

In one implementation directed at processing visual input from a neuroretina, five types of MUs may be implemented in the encoder. Red-on center that prefer bright pink or red (high L input) in the RF center and dark (low L and M) input in the RF surround; red-off center that prefer non-red (low L) input in the center and bright input (high L and M) in the surround; green-on center that prefer high M input in the center and low L and M input in the surround; green-off center that prefer low M input in the center and high L and M input in the surround; and blue-off center that prefer low S input in the RF center. Blue-on center signal is sub-served by the SBCs. In some implementations of the present model, for a maximal savings in the computational resources, the implemented number of the MU and SBC types is reduced from 6 to 2: namely, "L−M" MUs that prefer high L and low M, and "M-L" MUs that prefer low L and high M. When this is done, the center and surround of the MU RFs may have annular structure, or may have a "dipole" structure (non-concentric L and M regions of similar shape and size, e.g. approximately Gaussian), depending on application. It should be noted that the former is biologically rather accurate for the retinal periphery, whereas the latter is biologically rather accurate in the fovea or its vicinity. In other implementations, 4 or all 6 MU & SBC types may be implemented. When blue-on and blue-off RGCs are implemented, the RF centers for those two RGC types usually subtend substantially larger areas than the red-green MU RF centers.

In many applications, centers of RFs of the PUs of each type tile, and the centers of the RFs of the MUs of every type tile. In other applications, centers may overlap to some extent, or gaps may exist between the centers of the RFs.

Both in the biological retinas and in the present invention the cones and the bipolar cells produce graded output; the action potentials that make up the spiking retinal output are produced by the internal dynamics of the RGCs. All three types of the RGCs described above are spiking, both in biological retinas and in the present invention.

Biological retinas adapt, to some extent, to the intensity (illuminance) and the contrast of the incident light (the visual stimulus). Importantly, adaptation allows the matching of the output dynamic range of the RGCs to the range of (spectral) illuminance in the visual input. Biologically, adaptation occurs intrinsically in every type of retinal nerve cells, as well as extrinsically via pupil dilation and constriction. In the present invention, to save computational resources and hardware engineering efforts, we realize the intrinsic adaptation in the internal dynamics of the RGCs, as explained below.

MUs and PUs differ in their input connectivity and in the filtering of the input they receive from the model cone cells, but utilize the same basic spike generating mechanism described below. As described below, tonic characteristic of MUs responses may be enabled based on low-pass filtering their input. Furthermore, higher sensitivity of the PUs to weak stimuli may be achieved by normalizing their input by the history of the input variance.

Figure 2C:
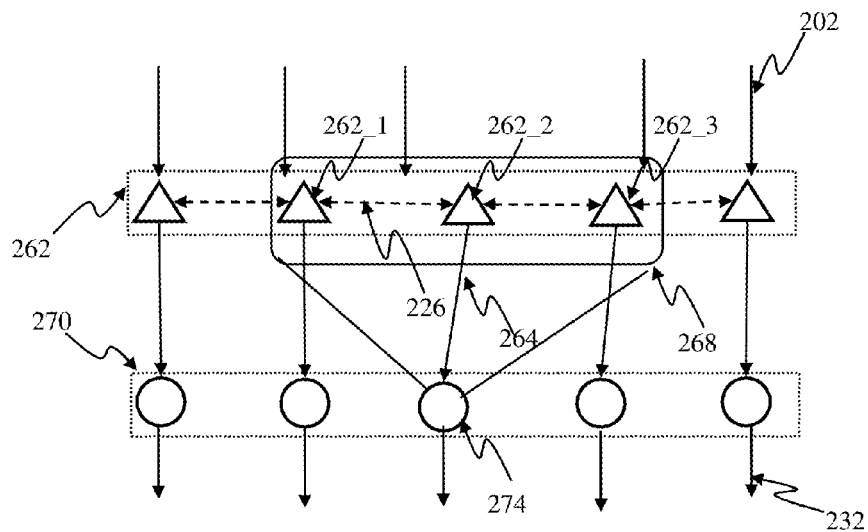
FIG. 2C is a block diagram illustrating connectivity between the photoreceptive block and the encoder block in accordance with one implementation.

While existing implementations may require multiple predetermined photoreceptor to neuron connections in order to obtain the desired spatial response (e.g., DoG) of the retinal apparatus, in one or more implementations, the units of the encoder block (e.g., the block 230, of FIG. 2A) may be coupled to the photoreceptive elements (e.g., the elements 220, of FIG. 2A) via a single photoreceptor to encoding neuron connection, as illustrated in FIG. 2C.

The diffusively coupled photoreceptive layer, described in detail in U.S. patent application Ser. No. 13/151,477, entitled "RETINAL APPARATUS AND METHODS", incorporated supra, advantageously enables to obtain, inter alia, DoG spatial response of the retinal apparatus using a single cone to output block connection, as illustrated by the connection 262 respect to FIG. 2C. As shown in FIG. 2C, the photoreceptive layer 262 may comprise several diffusively coupled cones, for example, 262_1, 262_2, 262_3 (as denoted by the resistive links 226 in FIG. 2C). One of the cones, e.g., the cone 262_2, may be coupled to the unit 274 of the encoding layer 270 via the connection 264. Diffusive cone coupling and cone to neuron connection 264 cooperate to cause generation of the appropriate spatial response (e.g., the area of confusion, depicted by the curve 268 in FIG. 2C). Coupling the photoreceptive block to the output block via a different connection may cause a different spatial retina response, as U.S. patent application Ser. No. 13/151,477, entitled "RETINAL APPARATUS AND METHODS", incorporated supra. The encoder configuration illustrated in FIG. 2C, may provide for the desired spatial response, with fewer connections, compared to configurations of prior art. Accordingly, a less expensive and simpler implementations of the sensory processing apparatus may be constructed while maintaining the desired response properties.

Diffusive coupling structure of the cone layer, advantageously allows for simplified connections between the cones. In one or more implementations, such simplified connectivity may be configured to reduce (or eliminate altogether) built-in (hard wired) delays presently used by the prior art. Hence, an apparatus utilizing diffusive connectivity of the present disclosure may reduce hardware complexity, and/or cost and improve performance and flexibility.

In some implementation, a generalization of a leaky integrate-and-fire spiking neuron model may be used to describe dynamic behavior of the neurons of the encoder block (e.g., the units 234 of block 230 in FIG. 2A). The membrane potential and the dynamic conductance of the neuron process of the present disclosure may be expressed as:

$$C\frac{du}{dt} = I - gu, \quad \text{(Eqn. 3)}$$

$$\tau_g \frac{dg}{dt} = g_\infty(u) - g, \quad \text{(Eqn. 4)}$$

$$g_\infty(u) = \max(a + bu, 0), \quad \text{(Eqn. 5)}$$

$$u = \max(u, u_{min}), \quad \text{(Eqn. 6)}$$

where:

I is the input stimulus (e.g., photodetector current and/or a digitized value of RGB pixel channel, C is membrane capacitance, set to one, in some implementations, u is the dimensionless membrane potential, and g is the dimensionless membrane dynamic conductance.

In some implementations, the parameters of Eqn. 3-Eqn. 6 may be configured as follows: $\tau_g$=20.3 ms (or generally between 2 and 100 ms), $u_{min}$=−0.5, a=0, b=0.0821 (or generally the value of $u_{min}$ and the functional form $g_\infty(u)$ that produce the correct firing pattern. In one implementation, the parameters of $g_\infty(u)$ may be parameterized by a curve-fit to the desired latency of the first spike as a function of the amplitude of a step-up in the input I).

In some implementations, multidimensional optimization techniques may be used to fit parameters a, b, $\tau_g$ to obtain desired characteristics of the neuron output. In one or more implementations, the desired output may be characterized by, for example, dependence of the spike latency of the first spike on the amplitude of a step-up in the input I and/or dependence of the timing of individual spikes on the temporal form of a particular input I(t) or set of inputs {I(t)}. "The neuron process of Eqn. 3-Eqn. 6 may be configured to generate an output (spike) when membrane potential u reaches or exceeds the firing threshold $u_{th}$. In that case the membrane potential and the conductance may be reset as:

$$u=0, \quad \text{(Eqn. 7)}$$

$$g=1. \quad \text{(Eqn. 8)}$$

In one or more implementation, the neuron dynamic model of Eqn. 3-Eqn. 6 may comprise an adaptive firing mechanism configured to adjusts the firing threshold $u_{th}$ as follows:

$$\tau_{uth}\frac{du_{th}}{dt} = u_{th\infty} - u_{th} + \Delta u \frac{t_{uth}}{dt}\delta, \quad \text{(Eqn. 9)}$$

where:

δ=1 is a parameter indicating the generation of neuron response at present time step (1 neuron spikes and 0 when it does not spike);

$u_{th\infty}$ is the membrane potential lower limit;

Δu is the membrane potential increment when the neuron generates response; and $\tau_{uth}$ is the adjustment time scale (e-folding decay window).

In one or more implementations, the adjustment time scale $\tau_{uth}$ may be configured in the range between 1 s and 10 s. The time scale $\tau_{uth}$ may be considerably longer compared to inter spike (ISI) interval. The threshold $u_{th}$ (determined by Eqn. 9) decays exponentially to the minimal allowed value of $u_{th\infty}$, that may be set to 0.33 in one implementation and/or in the range between 0.01 and 0.80). When the neuron generates a response (fires a spike) the threshold may be incremented by Δu. Value of Δu is chosen so that it is inversely proportional to the desired baseline firing rate of the neuron. That is, for larger Δu firing threshold $u_{th}$ of a neuron may increase rapidly whenever the neuron is active (generates spikes). As the firing threshold increases, neuron responses diminish in frequency even when the neuron is receiving a strong sustained input. In some implementations, the increment Δu may be set between 0.0005 and 0.02. In one or more implementations, any non-negative value can be used to produce the desired spiking responses. Hard ceiling for $u_{th}$ is set at 2.0 in some applications, and no hard ceiling is imposed on $u_{th}$ in many others. Initial value of $u_{th}$ may be set to 1.0. Time constant $\tau_{uth}$ may be set to 0.1-1000 s depending on the simulation duration and details; the value we used in most applications is 2 or 4 s The adjustment of Eqn. 9 may be applied to individual neurons of the encoder network independently from one another so that the encoder output rate may be configured as desired. In one or more implementations, the parameters a, b, $\tau_g$ $\Delta u$, $u_{th}$, $u_{th\infty}$ $\tau_{uth}$, and/or other parameters of Eqn. 3-Eqn. 9 may be adjusted, individually and/or in a combination. Multidimensional optimization techniques may be utilized in order to obtain a desired spike count, spike rate, spike timing, spike latency, inter-spike intervals, and/or any combination thereof, for a given temporal form of a particular input I(t) and/or a set of inputs {I(t)}.

In one implementation, the network may be configured to implement flexible biologically relevant encoder (for use, for example, with retinal prosthetics).

Parasol cells (PC) of mammalian retina are more sensitive to luminance (or L+M input direction) than to red-green chromaticity (or L−M input direction). Accordingly, in one implementation targeted at reproducing functionality of mammalian visual system, two types of parasol units may be defined: on-center parasols (OnPU) and off-center parasols (OffPU).

As described above with respect to FIG. 4, the PU receptive field may comprise biphasic temporal response. The PUs may be configured to respond to changes from dark to bright (OnPU) or from bright to dark (OffPU) at their RF centers.

In some implementations, the input I to the PUs may comprise a weighted linear combination of individual photoreceptor (e.g., cone) output $f_i$ from the cone layer, described, for example, by Eqn. 1. Accordingly, the parasol units may perform spatial integration of the input stimuli. In one or more implementations, the integration may comprise evaluating contributions from 10 to 400 inputs $f_i$.

Generation of the photoreceptive output (e.g., the output 202 in FIG. 2A) is described in detail U.S. patent application Ser. No. 13/151,477, entitled "RETINAL APPARATUS AND METHODS", incorporated supra.

In some implementations, the second temporal lobe of the PU RF (e.g., the lobe 412 in FIG. 4) may be configured to have lower amplitude 414 compared to the maximum amplitude of the first lobe 402. That is, the PU time kernel is configured to realize a linear combination of proportional and time-derivative operator In some implementations, spectral characteristics (e.g., the color-space direction) of the PUs may be configured close to L+M. That is, the PUs may receive the same-sign input from L and M cones, and the exact preferred color-space direction is defined by the relative abundance of L and M cones in the photoreceptive area corresponding to the unit RF. In some implementations, the DoG receptive field may comprise the surround area that is few times broader than the center. In one such implementation, the surround-to-center radius ratio may be configured equal 2. In some implementations, desirable for higher biological accuracy but requiring higher computational resources, a larger ratio may be used be used. As used herein, the term 'radius" is used to refer to the standard deviation of the 2D Gaussian envelope.

In some implementations, radius of the surround area may be limited to 3 times the standard deviation of Gaussian profile. In one or more implementations, the surround area may be configured such that spatial integral of its sensitivity is equal about 0.9 of that of the center area. Accordingly, the OnPUs may respond (weakly) to the full-field luminance increases and not to the full-field luminance decreases. Bringing the sensitivity ratio close to a unity may cause a weakened response to full-field increases in brightness.

In some implementations, the PU may be described using a space-time separable response, so that the center and the surround having the same time base. Correspondingly, the PUs may be more sensitive to moving stimuli and comprise lower (and/or altogether absent) directional selectivity (preferred directions). For example, the PU may respond to a local edge moving in any direction. In one or more implementations, the OnPUs and the OffPUs may comprise the same spatial and/or temporal RFs characteristics (such as described above), of the opposite sign. In some implementations, the PU may be described using a space-time inseparable response. In one or more implementations, the space-time inseparable response may be based on a low-pass filtering of the surround input and/or a delay of the surround input relative to the center input.

It may be of benefit to adapt encoder unit sensitivity to changes in input. In one implementations, parasol unit input sensitivity may be increased when a weaker (compared to prior stimulus as described below) stimuli. In one approach of the disclosure, the encoder unit adaptation may comprise rescaling of the averaged input I (e.g., the weighted average photodetector stimulus of Eqn. 1) into the PU dynamic model (e.g., the model and Eqn. 3-Eqn. 6). In or more implementation, the rescaling may be performed using a time-record (history) of variance v(t) of the averaged input I(t).

In some implementations, such as described in detail U.S. patent application Ser. No. 13/151,477, entitled "RETINAL APPARATUS AND METHODS", incorporated supra, photodetector output $f_i$ comprises zero-man signal Accordingly, mean of the input I(t) approaches zero, so that mean of its square approximately equals its variance v(t). The rescaled input $\hat{I}(t)$ may be expressed as:

$$\hat{I}(t) = \frac{I(t)}{(E + v(t))^\kappa}, I(t) = \sum (a_j f_j(t)) \qquad \text{(Eqn. 10)}$$

$$\tau \frac{d}{dt} v(t) = I(t)^2 - v(t). \qquad \text{(Eqn. 11)}$$

where:

the exponent κ may be used to control rescaling rate; and
E is a parameter configured to prevent numeric instability (e.g., a divide by zero) and/or prevent amplification of noise when signal too weak to carry usable information.

In some implementations, the exponent κ of the PUs may be configured equal 0.32. Accordingly, for large input signals, standard deviation of the scaled input $\hat{I}(t)$ to PUs increases with the increase of standard deviation of the raw input (e.g., the weighted photoreceptor output I(t) as follows:

$$\text{stdev}(\hat{I}(t)) \propto \text{stdev}(I)^{0.36} \qquad \text{(Eqn. 12)}$$

In one or more implementations, value of κ may be set between 0 and 0.5 to match specific design requirements. Generally, lower κ may produce low adaptation, while larger κ may result in variance of unity (whitened) signal.

Figure 6A:
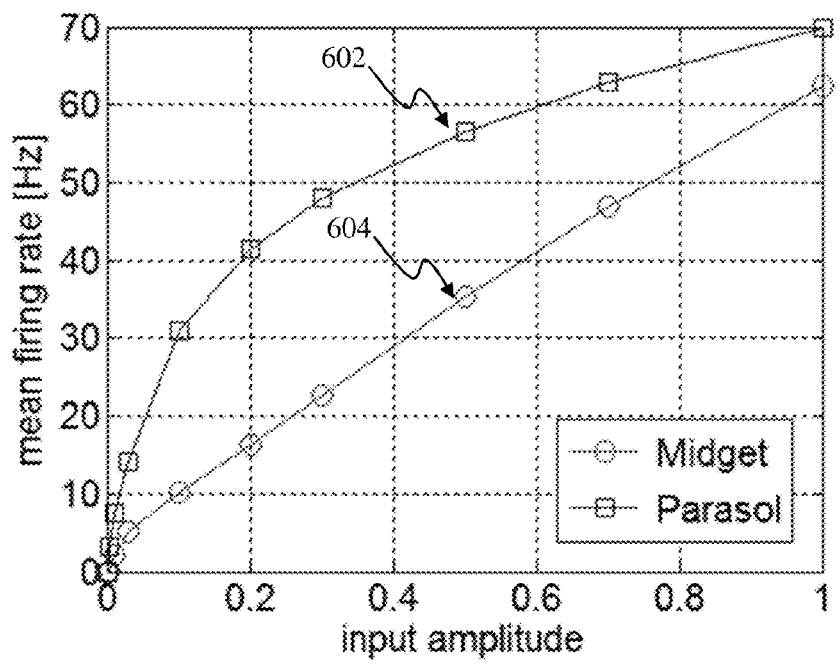
FIG. 6A is a plot presenting data related to output rates of encoder units in response to broadband stimuli of varying amplitude, in accordance with one implementation.

FIG. 6A illustrates exemplary responses of midget and parasol encoding units as a function of input amplitude. The input I(t) used to obtain data presented in FIG. 6A comprises wide-band signal (e.g., "white noise") with normalized amplitudes between o and 1.

Figure 6B:
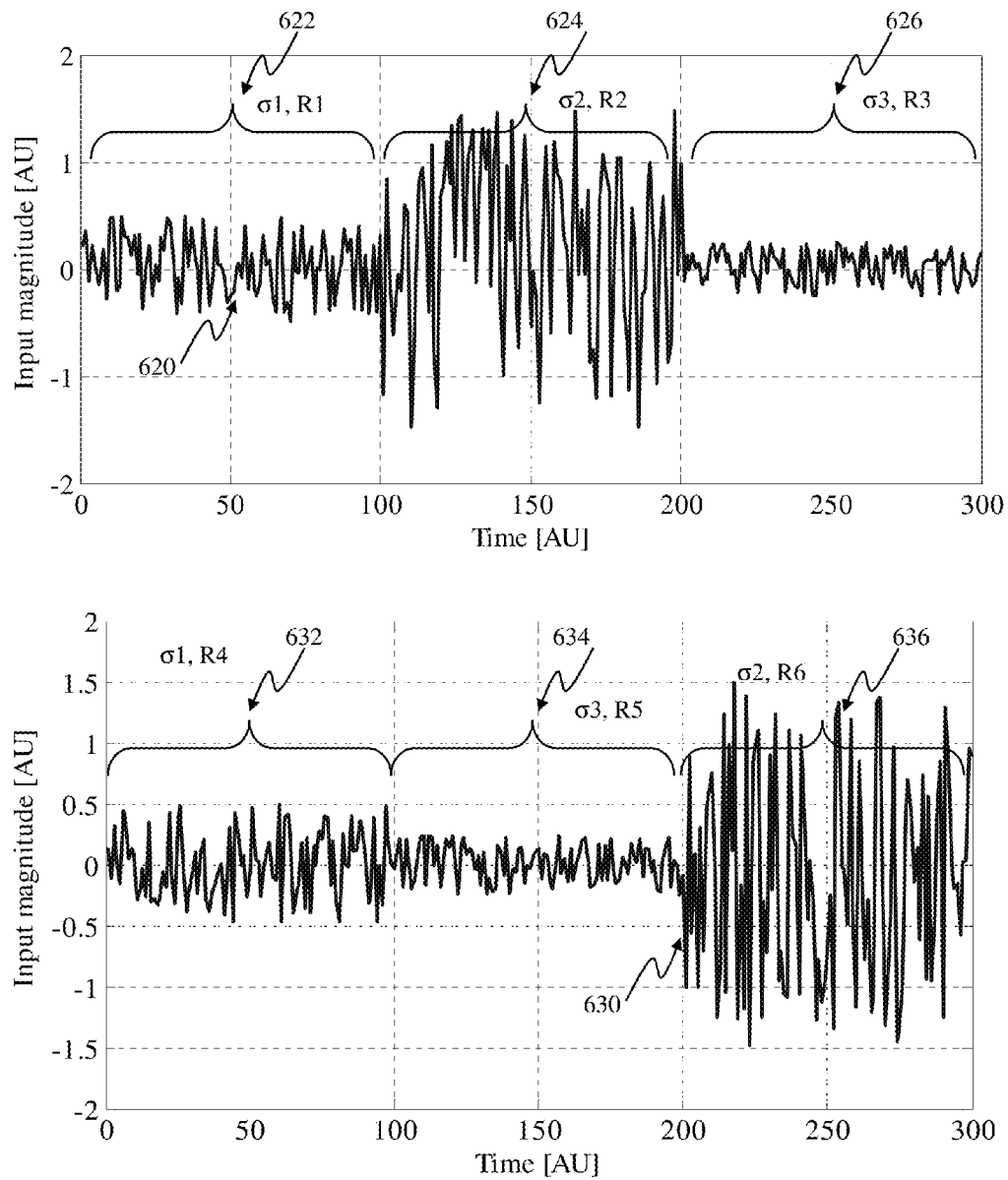
FIG. 6B is a plot illustrating adaptive rate encoding, in accordance with one implementation.
Figure 6C:
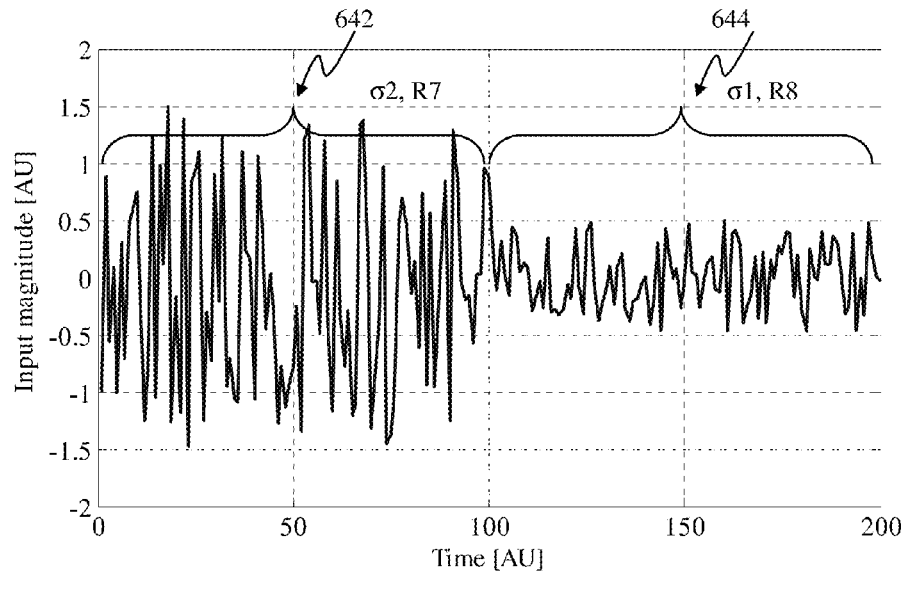
FIG. 6C is a plot illustrating adaptive rate encoding, in accordance with one implementation.
Figure 6C:
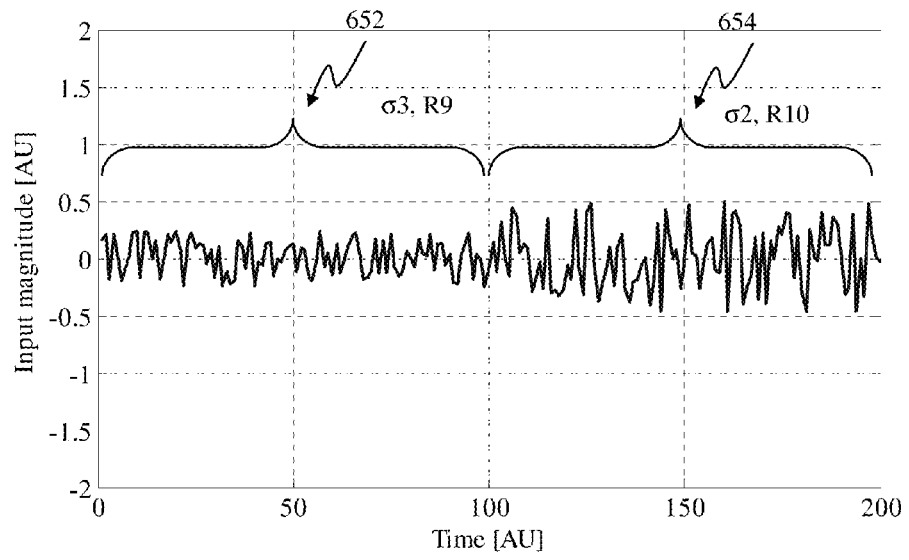

FIGS. 6B-6C illustrate adaptive rate encoding methodology of the disclosure. The curves 630, 640 depict input sensory data that may be provided to encoder (e.g., the data 202 provided to encoder 230 of FIG. 2A). The segments 622, 624, 626 of the input 620 are characterized by the variance values σ1, σ2, σ3, respectively. Similarly, the segments 632, 634, 636 of the input 620 may be characterized by the variance σ3, σ2, σ1, respectively. In one implementation, variance may be computed in accordance with Eqn. 11. For the purposes of illustrating one implementation of adaptive rate encoding of the disclosure, consider the input of segments 624, 634. As shown in FIG. 6B, variance of the segment 624 exceeds variance of the preceding segment 622: σ2>σ1. However, variance of the segment 634 is lower than variance of the preceding segment 632: σ3<σ1. In other words, compared to the segments 622, 632, respectively, variance of the segment 624 went up, while variance of the segment 634 went down. Accordingly, using Eqn. 10-Eqn. 111 the encoder rate R2 of the segment 624 is higher, compared to the encoder rate R1 of the segment 622, while the encoder rate R5 of the segment 634 is lower, compared to the encoder rate R4 of the segment 632. Correspondingly, the encoder rate R3 of the segment 626 is lower, compared to the encoder rate R2, while the encoder rate R6 of the segment 636 is greater, compared to the encoder rate R4.

As illustrated in FIG. 6C, the segment 644 is preceded by the segment 642, characterized by higher variance: σ2>σ1; while the segment 624 is preceded by the segment 642, characterized by lower variance: σ3<σ1. Accordingly, using Eqn. 10-Eqn. 111 encoder rate R8 of the segment 644 decreases (compared to the rate R7 of the preceding segment 642), while encoder rate R10 of the segment 654 increases (compared to the rate R9 of the preceding segment 652).

In one or more implementations, the encoder of the present disclosure (e.g., comprising parasols and/or midget units) may encode input into spike latency, as described, for example, in U.S. patent application Ser. No. 13/548,071, entitled "SPIKING NEURON NETWORK SENSORY PROCESSING APPARATUS AND METHODS", filed on Jul. 12, 2012, U.S. patent application Ser. No. 13/152,119, entitled "SENSORY INPUT PROCESSING APPARATUS AND METHODS", filed on Jun. 2, 2011, and U.S. patent application Ser. No. 12/869,573, entitled "SYSTEMS AND METHODS FOR INVARIANT PULSE LATENCY CODING", filed on Aug. 26, 2010, each of the foregoing being incorporated herein by reference in its entirety. In some implementations, input of larger amplitude may be encoded into one or more spikes with shorter latency, compared to the input of smaller amplitude. In some implementations, input amplitude may comprise deviation of input characteristic (e.g., luminance) from an average value (such as frame averaged luminance).

As shown and described with respect to FIG. 4A, the midget units may perform temporal integration of the input stimulus as a part of the spike generating process (e.g., the LIF process of Eqn. 3-Eqn. 6). In one or more implementations, the MUs may be configured to integrate over a smaller spatial extent (e.g., 2 photoreceptors) in their RF center and/or surround, compared to the spatial integration extent of the PUs. In some implementations, the MUs may be configured to integrate over a larger spatial extent (e.g., 3-20 photoreceptors), thereby producing a temporal-spatial integrator. In one implementation, the MU spatial integration may be weighted in accordance with the DoG response.

In some less computationally intensive implementation of sensory encoder, two types of MUs may be defined: red-on center MU (rMU) and green-on center MU (gMU). Individual rMU may receive positively-weighted input from several (one to two in some implementations) nearest L-cones and negatively-weighted input from one or more (same number as center, in some implementations, or a larger number, in some applications) nearest M-cones. Connection weight determination procedure is described below. In the implementations where the center and the surround are of the same size, there is no difference between red-on center MUs and the green-off center MUs in this apparatus; rMU sub-serve both roles. Connections to the gMUs are similar of those to the rMUs, but with positive weights for M-cone inputs and negative weights for the L-cone inputs. Therefore, model gMUs can be viewed as either green-on center MUs or red-off center MUs.

In some implementations comprising two MU types, cone to MU connection weights may be determined as follows: for rMUs, L input weights may set to 1/(number of L inputs). The M-connection weights may be set to −1/(number of M inputs).

In one or more computationally intensive implementations, comprising 4 types of red-green MUs, the MU centers may receive pure L and/or pure M inputs (positive L for red-on center MU, negative L for red-off center MU, etc., as described above). However, the surrounds may receive mixed L and M inputs. In one implementation, the mixed input may originate from a larger number of cones, with weights w=1/(total number of surround inputs) for off-center and w=−1/(total number of surround inputs) for on-center MUs.

In one or more implementations, surround input weights may decrease with distance d from the MU according to a function n(d). In one implementation, the decay function n(d) may comprise Gaussian dependence. Appropriately, the surround weight for input from the i-th photoreceptor may be expressed as:

$$w_i^- = \frac{n(d_i)}{\sum n(d_i)}, \; w_i^+ = -\frac{n(d_i)}{\sum n(d_i)}, \qquad \text{(Eqn. 13)}$$

for the off-center and on-center MUs, respectively.

In most computationally intensive implementations, where all 6 types of MUs and SBCs are used, the 4 red-green MU types are implemented the same way as above, and the blue-yellow chromaticity ("koniocellular pathway") is handled by the two additional "SBC" cell types implemented as described in the next subsection ("Other RGC types"). Please note that, for the ease of explanation, we designate both blue-on center and blue-off center RGCs as "SBCs". That is done solely to denote the fact that they are primarily sensitive to the blue-yellow chromaticity of the input signal, and does NOT imply that they are or are not distinct from MUs or from each-other in any details of their realization.

The input I to a MU is a weighted sum of the photodetector output values $f_i$ as described above. In order to reproduce the "tonic" character of the MU response as opposed to "phasic" response of the PUs, the input I to MUs may be low-pass filtered in time. The low pass filter may be, in some implementations, described by a first-order differential equation:

$$\tau_I \frac{dJ}{dt} = I - J, \qquad \text{(Eqn. 14)}$$

where J is the low-pass filtered input. In these implementations, the low-pass filtered input J may be used in the spike generation mechanism (for example, in place of the input I of Eqn. 3-Eqn. 6). In some implementations, the time constant $\tau_I$ may be set to 20 ms, producing a relatively fast response; in other implementations, other values (usually in the 20-200 ms range) are used for $\tau_I$, producing slower time response.

In some implementations the photoreceptor (e.g., the source of the input 202 in FIG. 2A) may comprise the diffusively coupled cones described in detail U.S. patent application Ser. No. 13/151,477, entitled "RETINAL APPARATUS AND METHODS", incorporated supra, As such diffusively coupled cones are characterized by linear process, the averaged output of the cones (e.g., the input into the encoder neuron I(t)) may be scaled linearly with the input stimulus amplitude, without adaptation. Such approach may advantageously this saves considerable computational and engineering effort. Intrinsic retinal adaptation mechanisms may be implemented in the RGCs. Adaptation mechanisms in the RGCs, implemented as described here, may be sufficient to match the output dynamic range to that of the input, typically over 100-1000 fold range of stimulus amplitudes. In some implementations, the adaptation mechanisms of the disclosure may be utilized with inputs having dynamic range in excess of 1000 fold, by adjusting the spike time resolution and/or adaptation threshold parameter values. In conjunction with eye pupil or optical device aperture and/or shutter providing additional adaptation range, the adaptive encoding mechanism of the disclosure may be adequate for processing visual inputs in most applications. Notwithstanding, in some implementations an additional global or local adaptation mechanism of the rescaled input $\hat{I}(t)$ may be utilized. In one or more implementations, comprising a cone photoreceptive layer, such as described, for example in U.S. patent application Ser. No. 13/151,477, entitled "RETINAL APPARATUS AND METHODS", incorporated supra, the adaptation of the input may be implemented separately for individual cones. This additional adaptation mechanism, inter alia, helps minimize the effect of the spectrum of the illuminant on the apparatus response, and to improve the color constancy.

The Small Bistratified Units (SBUs) may be added to the encoder network (e.g., the encoder 240 of FIG. 2B) in order to, for example, to sub-serve the 2S-(L+M) color axis. That is, the blue-yellow color direction. In one implementation, a blue off-center SBU may be s along with the real blue on-center SBCs, and not to have the MUs handle the blue off-center responses. The SBU RF shape (but not the preferred color direction) is either DoG, like that of the PUs. When maximal biological accuracy is desired, a center-only Gaussian (no surround) blue-on SBUs may be used. Time-response low pass filter time constant of the SBUs may be tuned to match performance requirements of the application. In particular, blue pathway may be made somewhat slower than the red & green pathway (for example, using longer time constants of time integration of the cone input to the RGCs) to reproduce more accurately the processing of movement and color in primates.

This implementation may further improve computational performance, at the expense of introducing variability in the PU receptive fields.

Figure 7A:
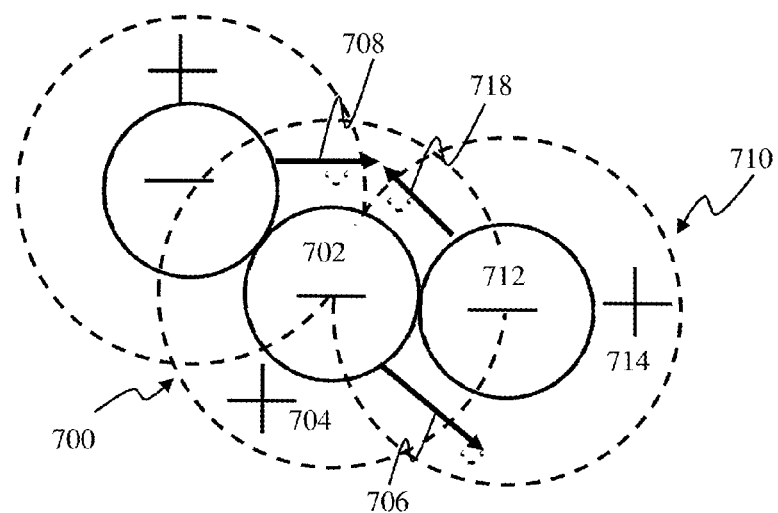
FIG. 7A is a graphical illustration depicting lateral connectivity of the encoder network, according to one or more implementations.

In one such implementation, the number of connections from photodetectors (e.g., the detectors 220 in FIG. 2A) to PU surrounds (e.g., the area 304 in FIG. 3) may be reduced. Such cone-to encoder connections (e.g., the connections 222 in FIG. 2A) are computationally expensive and may be replaces with lateral connections between the receptive fields of neighboring PUs 700, 710 as illustrated in FIG. 7A. FIG. 7A depicts plan view of a single encoder layer (e.g., the parasol layer), comprising lateral connectivity. The lateral connection 708 may be interpreted as playing the role of the amacrine cells in the vertebrate retinas. In one implementation, the center input 702 of one PU (700 in FIG. 7A) may be combined with the center inputs of the neighboring PUs (e.g., the surround area 714 of the PU 710 in FIG. 7A). Conversely, the connection 706 may effectuate a combination of the center input 712 with the center input 702 of the PU 700.

In one implementation, the combination may comprise a subtraction and a constant scale factor as follows:

$$\hat{I}^i = I^i_{cent} - \Sigma_{j \neq i} A_j I_{cent}^j \quad \text{(Eqn. 15)}$$

where
$I^i$ is the input into the i-th PU from respective photodetectors within its receptive field center;
$\hat{I}^i$ is the combined input into the i-th PU RF;
$I_{cent}^j$ is the input into the neighboring j-th PU from respective photodetector within its receptive field center; and
$A_j$, is the scale factor.

In this implementation, surround input to any PU comprises a weighted sum of center inputs to a few (typically 5-25) neighbor PUs, which is in contrast to the Implementation I where surround input to any PU comprises a weighted sum of many (typically, hundreds or in some implementations thousands) cone inputs. The PU surrounds in the Implementation II may or may not receive some direct cone inputs, as well; but for the sake of computational performance and/or engineering costs it is preferable that they do not.

In one realization of the lateral connectivity, the number of surround receptive fields in Eqn. 15 may be selected equal 10 and the scale factor Aj=0.1.

In some implementations, the lateral connections within the encoder block (e.g., the connections 706, 708) may comprise instant links. That is, the contributions of e.g., Eqn. 15 are added instantaneously so that the, i.e., have. We simply add neighbor PU center inputs from the same time instance to yield the surround input. In this case, the PU RFs will be approximately time separable.

In some implementations, the PU may be described using a space-time inseparable response. In one or more implementations, the space-time inseparable response may be based on a low-pass filtering of the surround input and/or a delay of the surround input relative to the center input.

Figure 7B:
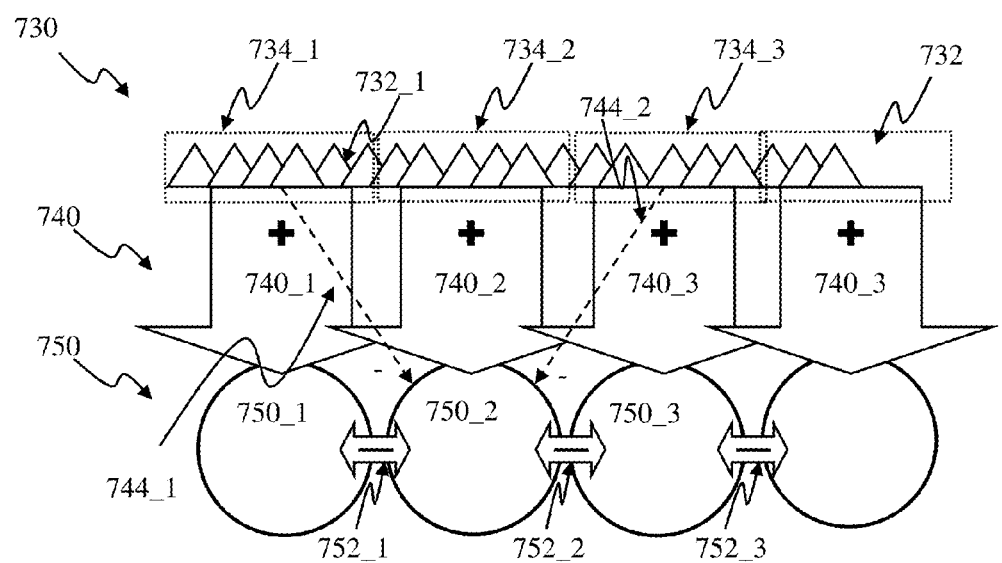
FIG. 7B is a graphical illustration depicting photodetector and lateral connectivity of the encoder network, according to one implementation.

FIG. 7B illustrates lateral connectivity implementation in conjunction with the encoder to photodetector connectivity. The processing apparatus 730 of FIG. 7B may comprise a photodetector layer 732, input connectivity (e.g., photodetector to encoder) layer 740 and the encoder layer 750. The encoder layer may comprise one or more encoder units 750_1, 750_1, 750_3 characterized by receptive fields (e.g., the broken line rectangle denoted 734 in FIG. 7B). The circles in FIG. 7B denote the centers of the unit 750 receptive fields. The RF surround portions are not shown for clarity. In one implementation, the units 750 may comprise the parasol units described supra.

The receptive fields 732 of the units 750 may comprise two or more (5 in one implementation) photodetectors 732_1. The connectivity between the photodetectors within the receptive field of a unit 750 is denoted by the vertical arrow 740. By way of example, the unit 752_2 receives input from photodetectors within the receptive field 734 via the connection map 740_2. The connections 740 may comprise excitatory connections denoted by the '+' sign in FIG. 7B.

The encoder layer 750 may further comprise lateral connections 752 between RF centers of neighboring encoder units (e.g., the units 750). The connections 752 are inhibitory (as seen from Eqn. 15) as denoted by the '−' sign in FIG. 7B.

In one implementation, the lateral connectivity (e.g., the connections 752 in FIG. 7B) may be interpreted as providing inhibitory input from receptive fields of neighboring encoder units. By way of example, in FIG. 7B, the unit 750_2 may receive excitatory input from photodetectors of the receptive field 732_2 (denoted by the arrow 740_2) and inhibitory input from photodetectors of the receptive fields 732_1, 732_3 (of the units 750_1, 750_3, respectively). Such inhibitory input into the unit 750_2 is depicted by the broken line arrows 744_1, 744_2 (denoted by the '−' sign), respectively. It is noteworthy, that the inhibitory input 744_1, 744_2 may be scaled by a factor less than unity.

In some implementations, the lateral links 752 may be reciprocal so that the unit 750_2 may provide inhibitory input to the unit 750_3, while the unit 750_3 may provide inhibitory input to the unit 750_2.

In some implementations, the lateral connections may comprise dynamic process characterized by a propagating time (e.g., delay). The time dynamics of the lateral connections may be realized as, for example, a delay of several milliseconds (in the range between 2 ms and 20 ms). In one implementation, the time dynamics may be realized using a low-pass filter with a relatively short time constant (in the range between 2 ms and 20 ms) or longer when required.

PU implementation comprising instant lateral connections is characterized by time-separable PU receptive fields. In such implementations, the PU receptive fields may be described using a product of a temporal and a spatial part.

In the encoder implementation comprising lateral connections (i.e., the Implementation II described above) the MU and/or SBU neurons may be implemented using the framework described above with respect to the encoder Implementation I (e.g., without lateral connectivity). In some realizations of the Exemplary Encoder implementation II, the SBUs layer may comprise lateral connectivity as described above with respect to PU layer of the Implementation II.

Figure 8A:
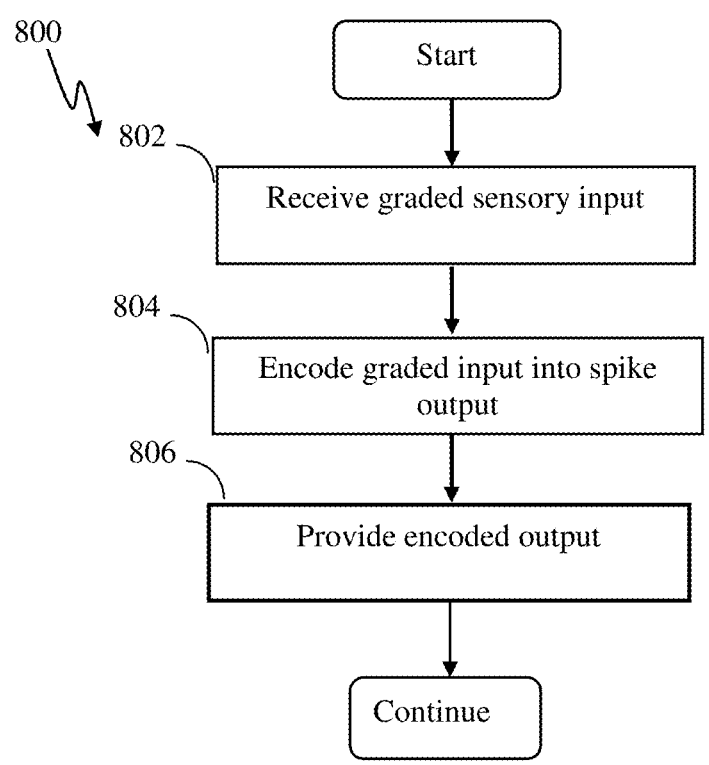
FIG. 8A is a logical flow diagram illustrating generalized method of encoding graded sensory input into spiking output in accordance with one or more implementations.

Referring now to FIG. 8A exemplary method of encoding graded sensory input into spike output is shown and described in accordance with one implementation.

At step 802 of method 800 of FIG. 8A, graded sensory input may be received by encoder (e.g. the encoder 230 of FIG. 2A). In one or more implementations, the graded input may comprise visual input provided by a diffusively coupled photoreceptive layer (e.g., the layer 220 of FIG. 2A). In some implementations, described in detail below with respect to FIGS. 10A-10B, the visual input may comprise ambient light stimulus 1052 captured through, inter alia, optics of an eye. In some implementations, such as, for example, encoding of light gathered by a lens 1064 in visual capturing device 1160 (e.g., telescope, motion or still camera, microscope, portable video recording device, smartphone), illustrated in FIG. 10B below, the visual input received at step 802 of method 800 may comprise ambient light stimulus 1062 captured by, inter alia, device lens 1064 or output of the imaging (CMOS/APS) array. In one or more implementations, such as, for example, retinal encoder 1076 configured for digitized visual input in a processing apparatus 1070 (e.g., portable video recording and communications device) described with respect to FIG. 10B, below, the visual input of FIG. 8 may comprise digitized pixel values (RGB, CMYK, grayscale) refreshed at suitable rate. In one or more implementations, the visual stimulus may correspond to an object (e.g., a bar that is darker or brighter relative to background) or a feature (e.g., an edge) being present in the field of view associated the input.

At step 804, the graded input may be encoded into spike output. In some implementations, the encoding may be effectuated using spiking neurons operable in accordance with the SRP configured using Eqn. 3-Eqn. 6. The encoding may comprise input rescaling (e.g., as described by Eqn. 11-Eqn. 12 and/or response generation threshold adjustment (e.g., of Eqn. 9).

At step 806, the encoder may provide encoded output. In some implementations, the output rate of the encoder apparatus may be configured to match the input dynamic range due to, at least in part, adaptive adjustment mechanism, as described in detail above.

Figure 8B:
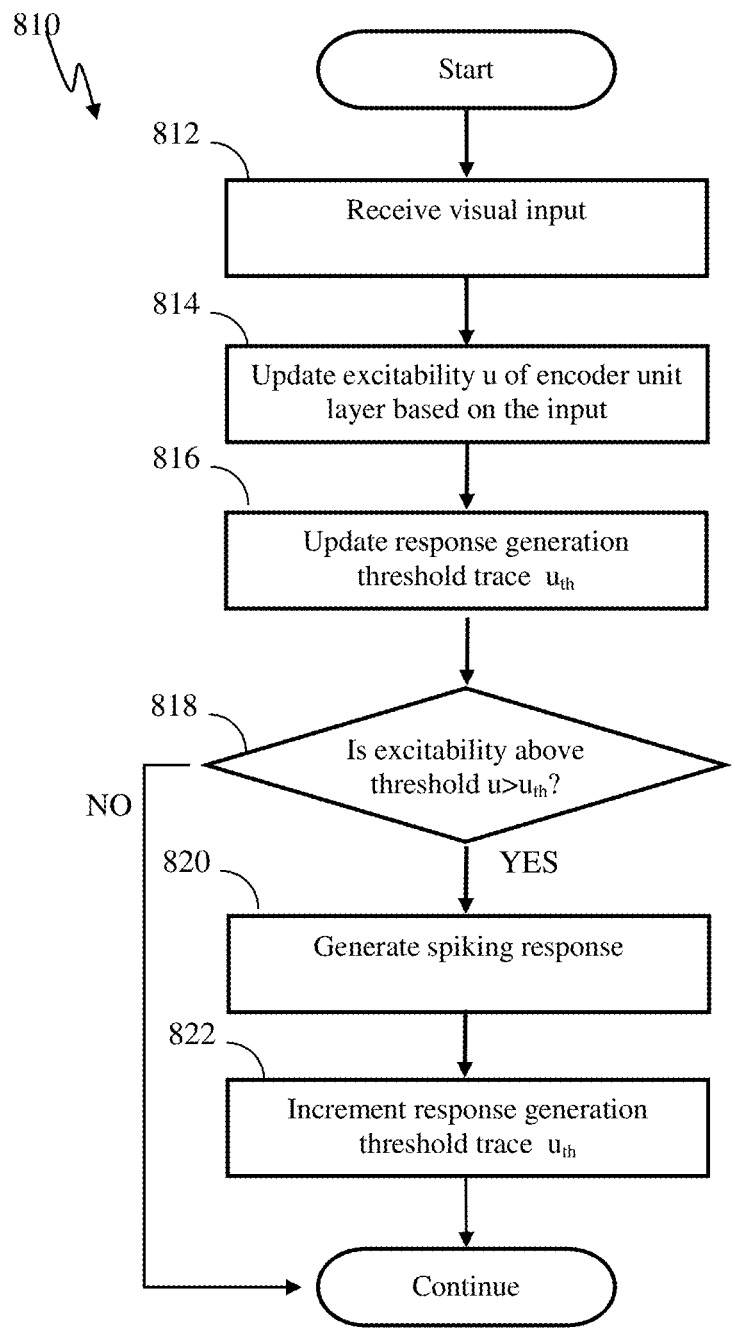
FIG. 8B is a logical flow diagram illustrating method of dynamically adjusting neuron response threshold for use in visual input encoding method of FIG. 8A.

FIG. 8B illustrates generalized method dynamically adjusting neuron response threshold for use in visual input encoding method of FIG. 8A, in accordance with one implementation.

At step 812 of method 810, visual input may be received. As described above with respect to FIG. 8A, visual input may comprise ambient light input, output of a CMOS imager array or digitized stream of pixels. In one or more implementations, the visual stimulus corresponds to an object (e.g., a letter that is darker or brighter relative to background) for a feature being present in the field of view of a visual sensor.

At step 814, the dynamic parameters of the neuron process (e.g., excitability as expressed by the neuron membrane voltage u described may be updated according to, for example, SRP governed by Eqn. 3-Eqn. 6 Eqn. 6 based on the received input I.

At step 816, spike generation threshold trace $u_{th}(t)$ may be adjusted. In one implementation, the adjustment may be based on Eqn. 9.

At step 818, the updated excitability may be compared to the current threshold value $u_{th}$.

When the excitability is above the threshold, the method may proceed to step 820 where spike response may be generated. In some implementations, the neuron process may be subsequently reset in accordance, for example, with Eqn. 7-Eqn. 8.

At step 822, the response threshold may be updated. In some implementations, the update may comprise incremental adjustment where an increment value may be added the threshold trace $\hat{u}_{th}(t+1) = u_{th}(t) + \Delta u$. In some implementations, the update may comprise proportional adjustment where the threshold trace may be multiplied by a scale parameter p: $\hat{u}_{th}(t+1) = u_{th}(t)_p$. In one implementation the parameter p may be selected as p>1.

Figure 8C:
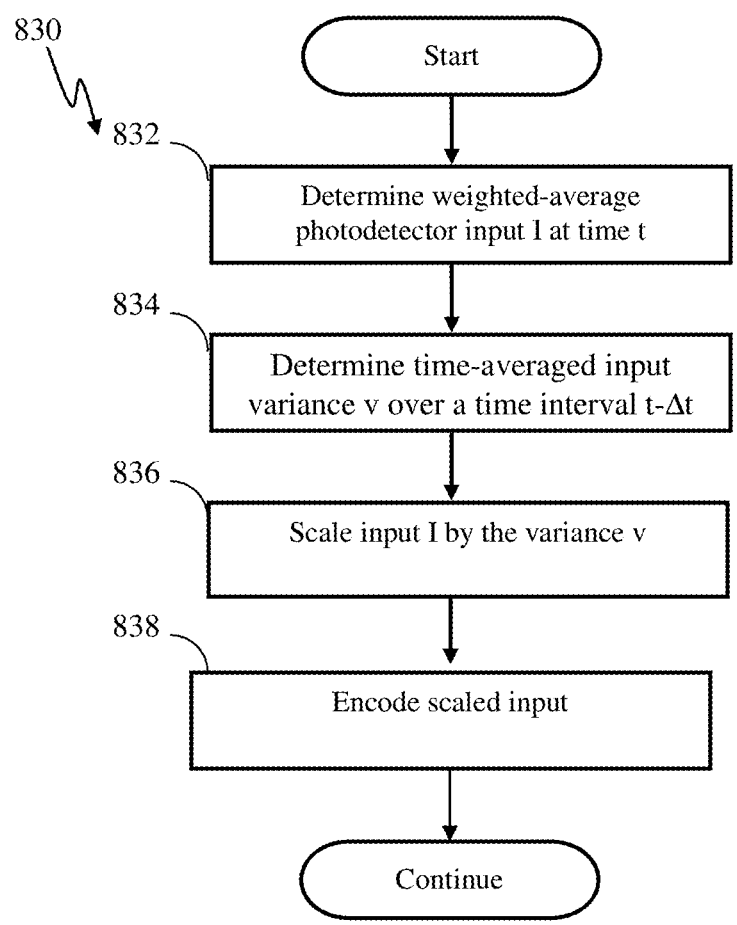
FIG. 8C is a logical flow diagram illustrating method of input scaling for use in visual input encoding method of FIG. 8A.

FIG. 8C illustrates adaptive input adjustment for use with the input encoding method of FIG. 8A, in accordance with one implementation.

At step 832 of method 830, an input $f_i$ may be received at time t0 from a plurality of photodetectors and an average input I may be determined. In one implementation, the average input may comprise weighted sum of Eqn. 1.

At step 834 a time-averaged variance v of the input may be determined. In one implementation, the time averaging may be performed using input, previously received over a time interval Δt prior to the time t0. In one or more implementations, the variance may be determined using a solution of differential Eqn. 11.

At step 836, the averaged input I may be scaled by using, for example Eqn. 10. In one or more implementations, the neuron excitability may be adjusted instead using the averaged variance.

At step 838, the input may be encoded. In one or more implementations, the encoding may comprise encoding the rescaled input into spike output using Eqn. 3-Eqn. 6, and Eqn. 9.

Figure 9A:
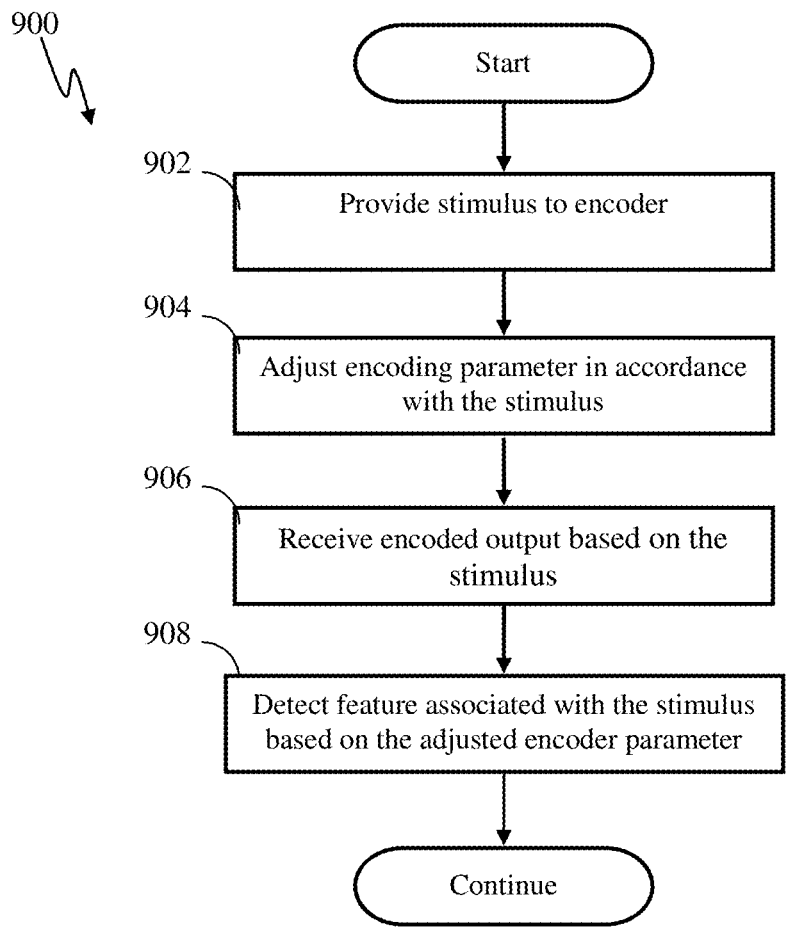
FIG. 9A is a logical flow diagram illustrating generalized method of feature detection using spiking encoder comprising input dynamic range adjustment, in accordance with one or more implementations.

FIG. 9A illustrates generalized method of feature detection using spiking encoder comprising input dynamic range adjustment, in accordance with one or more implementations.

Figure 10A:
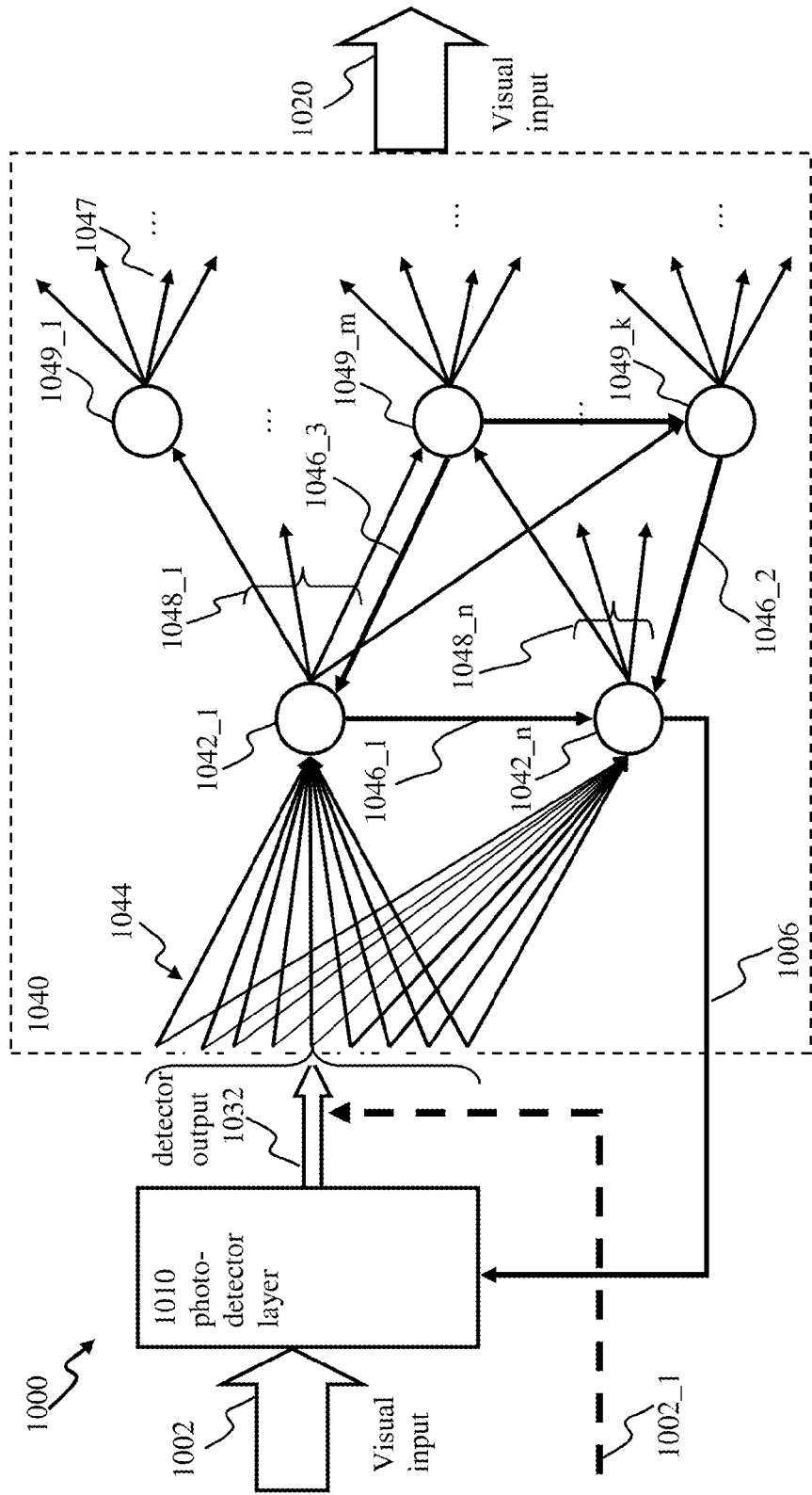
FIG. 10A is a block diagram illustrating visual processing apparatus comprising retinal encoder configured in accordance with one or more implementations.

At step 902 of method 900, input stimulus may be provided to the encoder apparatus (e.g., the apparatus 1000 of FIG. 10A). As described above with respect to FIG. 8A, visual input may comprise ambient light input, output of a CMPS imager array or digitized stream of pixels. In one or more implementations, the visual stimulus corresponds to an object (e.g., a letter that is darker or brighter relative to background) and/or a feature being present in the field of view associated the retinal apparatus.

At step 904, parameters of the encoder may be adjusted in accordance with the stimulus. In some implementation, the adjustment may comprise response threshold adjustment, excitability adjustment; and/or input scaling, as, for example, described with respect to FIGS. 8B and 8C.

At step 906, the stimulus may be encoded and the output of the encoder may be received. In some implementations, the encoded output may comprise the output 232 of FIGS. 2A-2B.

At step 908, a feature detection may be performed using the encoded output and any applicable methodologies, such as, for example, described in U.S. patent application Ser. No. 13/152,119, Jun. 2, 2011, entitled "SENSORY INPUT PROCESSING APPARATUS AND METHODS".

Figure 9B:
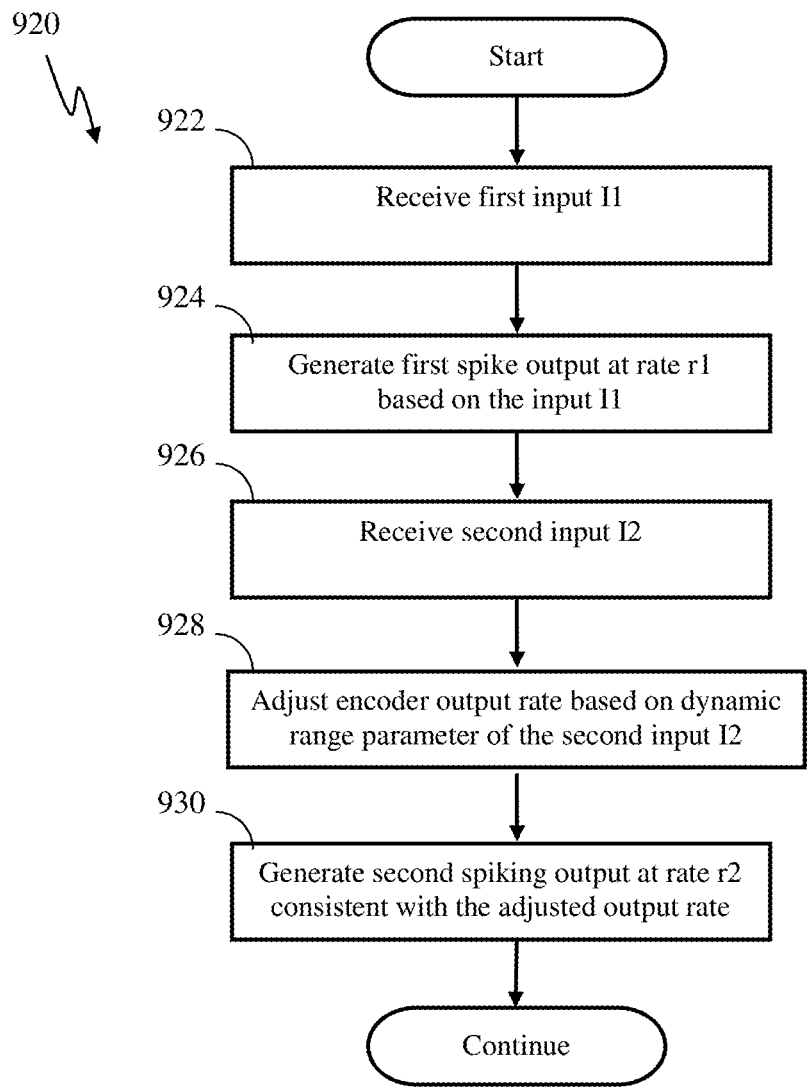
FIG. 9B is a logical flow diagram illustrating spiking encoder output rate control based on input dynamic range adaptation in accordance with one implementation.

FIG. 9B illustrates spiking encoder output rate control based on input dynamic range adjustment in accordance with one implementation. In some implementations, the encoder may comprise processor of cellular telephone coupled to a video capturing device (e.g., camera) comprising artificial retinal apparatus of the disclosure. In one or more implementations, the encoder may be embodied in a remote server, coupled, for example, to several surveillance cameras equipped with the artificial retinal apparatus of the disclosure.

At step 922 of method 920, first input I1 may be received. As described above with respect to FIG. 8A, visual input may comprise ambient light input, output of a CMPS imager array or digitized stream of pixels. In one or more implementations, the visual stimulus corresponds to an object (e.g., a letter that is darker or brighter relative to background) and/or a feature being present in the field of view associated the retinal apparatus. In one implementation, the input I1 may comprise input 642 and/or input 652 shown in FIG. 6C.

At step 924, encoded output may be generated. The output may be characterized by the output rate R1 (such as the rate R7 of FIG. 6C).

At step 926 second input I2 may be received. In one implementation, the input I2 may comprise input 644 and/or input 654 shown in FIG. 6C.

At step 928, the encoder output rate may be adjusted using any of the applicable methodologies described above, for example, with respect to FIGS. 6B-6C.

At step 930, encoded output may be generated. The output may be characterized by the output rate R2 (such as the rate R8 and/or rate R10 of FIG. 6C). By way of illustration, then the variance of the input I2 is lower than the variance of the input I1, the output rate R2 may be lower as compared to a realization then the variance of the input I2 is higher than the variance of the input I1.

Figure 9C:
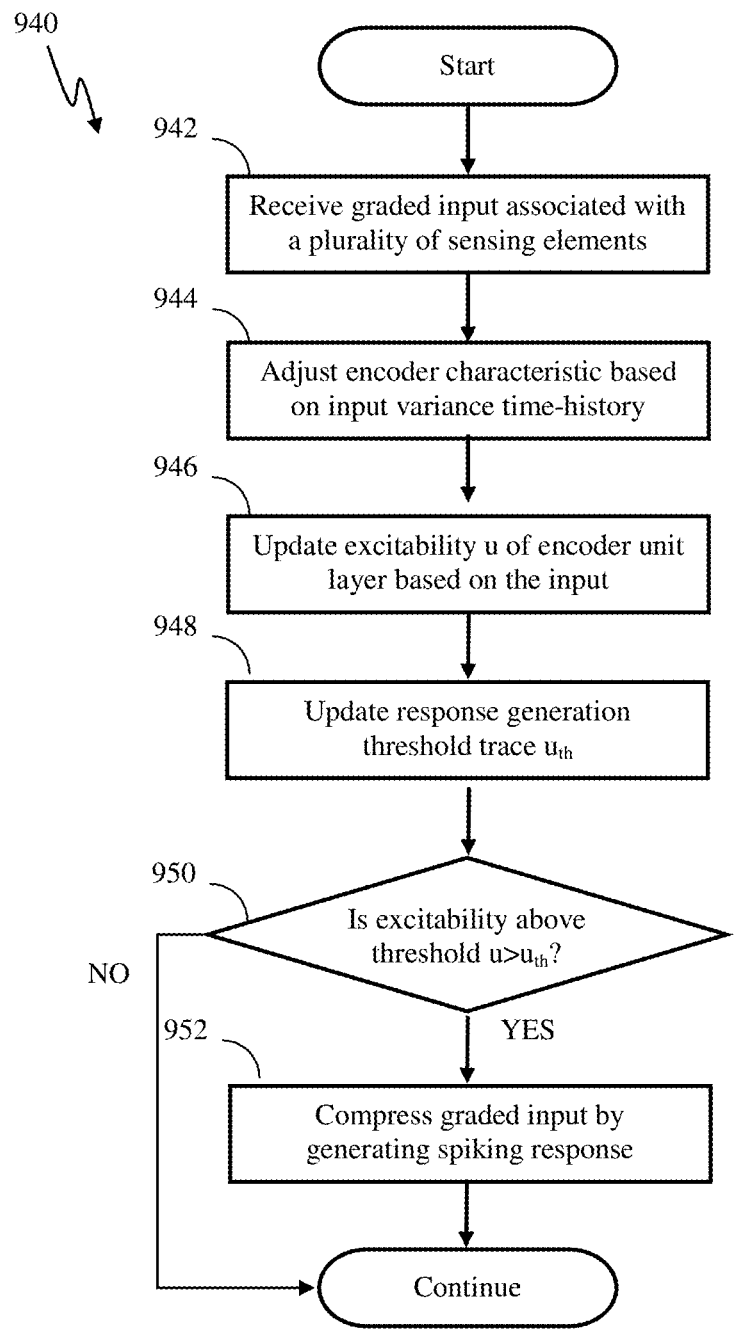
FIG. 9C is a logical flow diagram illustrating graded sensory data compression using spiking encoder in accordance with one implementation.

FIG. 9C illustrates graded sensory data compression using spiking encoding method of FIG. 8A, in accordance with one implementation.

At step 942 of method 940, input may be received. In some implementations, the input may be based on a plurality of sensing elements, such as diffusively coupled cones of artificial retina apparatus described in detail, for example, in pending U.S. patent application Ser. No. 13/151,477, entitled "RETINAL APPARATUS AND METHODS", incorporated supra; and/or digitized stream of pixels.

At step 944 encoder characteristics may be adjusted. In some implementations, the characteristics may comprise excitability (parameterized by the membrane potential of the SRP). The adjustment may comprise scaling excitability based on time history of input variance described above.

At step 946, the adjusted excitability may be updated based on the averaged (over the individual sensing element contributions). In one implementation, the update may be effectuated based on Eqn. 3.

At step 948, the response threshold $u_{th}$ may be updated for example, to implement time decay.

At step 950, the updated excitability may be compared with the updated response threshold $u_{th}$.

When the excitability $u > u_{th}$, the method may proceed to step 952 where spiking response may be generated. Accordingly, the spike response comprises a compressed version of the input based on one or more of the following: spatial and/or temporal averaging of the input by RF of individual neurons; response generation when the input is sufficient to transition neuron dynamic state above threshold. In one or more implementations, an input comprising a large number of graded photoreceptor components over duration of time may be replaced by a single, binary (1-bit) event that may indicate the presence of the relevant feature in the input. In one or more implementations, a frame of 200×200 8-bit pixel values corresponding to a 40-ms time interval containing representation of a triangle may be compressed to a single bit associated with a 1-ms network update rate.

Figure 9D:
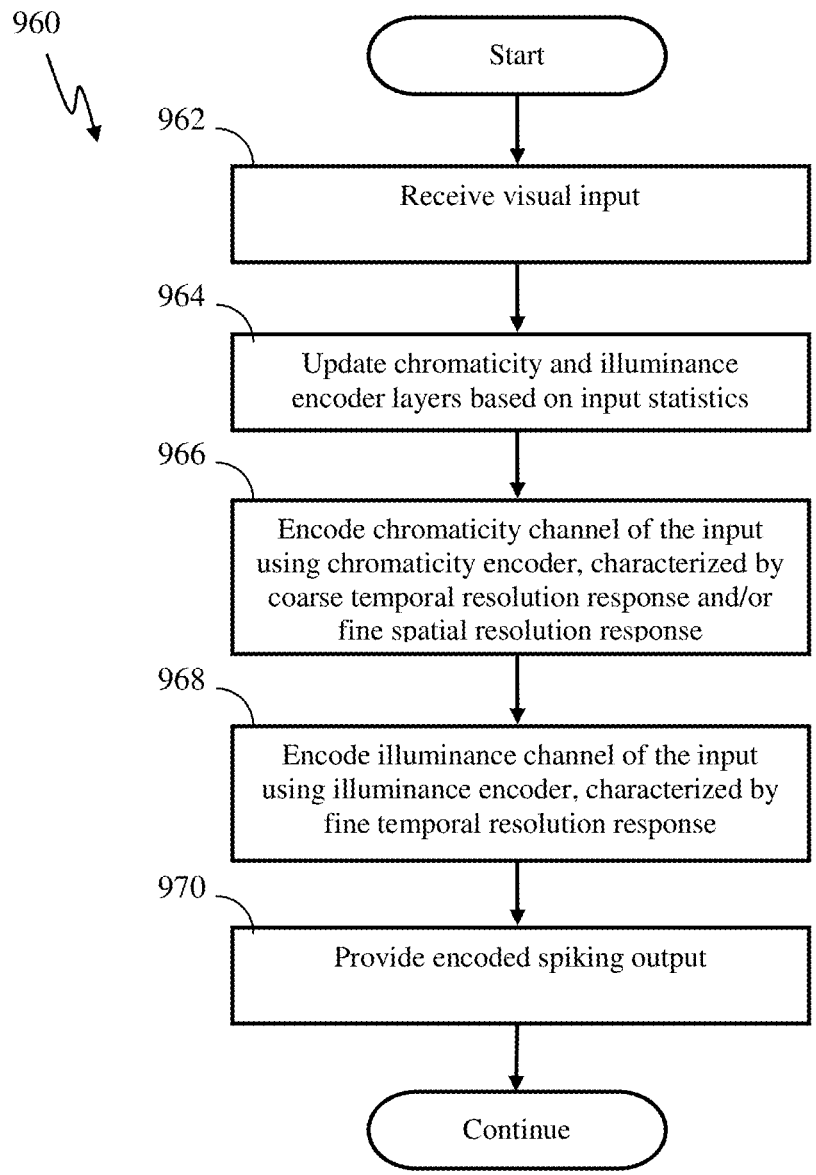
FIG. 9D is a logical flow diagram illustrating visual data spiking encoder comprising individually configured response characteristics for chromaticity and illuminance, in accordance with one implementation.

FIG. 9D illustrates one implementation of visual data spiking encoder comprising individually configured response characteristics for chromaticity and illuminance channels. In some implementations, the encoder may comprise two or more neuron layers. Individual layers (e.g., the layers 242, 244, 246 of encoder 240 in FIG. 2B) may be configured to encode different aspects of the input (e.g., chromaticity and luminance)

At step 962 of method 960, visual input may be received. In some implementations, the input may be based on a plurality of sensing elements, such as diffusively coupled cones of artificial retina apparatus described in detail, for example, in pending U.S. patent application Ser. No. 13/151,477, entitled "RETINAL APPARATUS AND METHODS", incorporated supra; and/or digitized stream of pixels. The input may be characterized by a chromaticity and luminance channel (e.g., color). In some implementations, chromaticity channel may describe quality of input color regardless of its luminance, that is, as determined by its hue and colorfulness (or saturation, chroma, intensity, or excitation purity. The luminance channel may describe a photometric measure of the luminous intensity per unit area of the input (e.g., brightness). Input comprising, for example, RGB color model pixels may be transformed into luminance and one (or two) chromaticity channels.

At step 964 chromaticity and/or luminance encoder layers characteristics may be adjusted. In some implementations, the characteristics may comprise excitability (parameterized by the membrane potential of the SRP). The adjustment may comprise scaling excitability based on time history of input variance of the respective channel as described above.

At step 966, the chromaticity channel of the input may be encoded using the adjusted chromaticity encoder layer. In some implementations, the chromaticity encoder may be characterized by coarse (compared to the luminance encoder) temporal response resolution. In some implementations, the chromaticity encoder may be characterized by fine (compared to the luminance encoder) spatial response resolution. In one or more implementations, the chromaticity encoder may comprise one or more layers comprising midget units of one or more types. Accordingly, the coarse temporal resolution and/or fine spatial resolution of the chromaticity encoder may be based on temporal filtering and/or small spatial extent of the midget units, as described with respect to FIGS. 3-4B. In some implementations, the encoder apparatus may comprise two or more luminance encoders configured to encode input comprising two or more chromaticity channels.

At step 968, the luminance channel of the input may be encoded using the adjusted luminance encoder layer. In some implementations, the luminance encoder may be characterized by fine (compared to the chromaticity encoder) temporal response resolution. In some implementations, the luminance encoder may be characterized by coarse (compared to the chromaticity encoder) spatial response resolution. In one or more implementations, the luminance encoder may comprise one or more layers comprising parasol units of one or more types. Accordingly, the fine temporal resolution and/or coarse spatial resolution of the chromaticity encoder may be based on absence of temporal filtering and/or larger spatial extent of the parasol units, as described with respect to FIGS. 3-4B.

At step 970, the encoded output may be provided. In some implementations comprising input with a separate luminance and chromaticity channels, the output may be combined in order to find boundaries of the surfaces and/or object (image segmentation) based on both color and brightness edges.

It will be appreciated by those skilled in the art that the methods described with respect to FIGS. 8A-9D may be also used to process inputs of various electromagnetic wavelengths, such as for example, visible, infrared, ultraviolet light, and/or combination thereof. Furthermore, the retinal encoder of the disclosure may be equally useful for encoding radio frequency, magnetic, electric, or sound wave information.

Various exemplary spiking network encoder apparatus are described below with respect to FIGS. 10A-11C.

An apparatus 1000 for processing of sensory information using spiking encoder approach described above is illustrated in FIG. 10A, according to one implementation. The processing apparatus 1000 may comprise photodetector layer 1010 (e.g., the layer 220 of FIG. 2A) that may be configured to receive sensory input 1002. In some implementations, such as, for example, artificial retinal prosthetic 1050 illustrated in FIG. 10B, described in detail below, this visual input may comprise ambient light stimulus 1052 captured through, inter alia, eye lens. In some implementations, such as, for example, encoding of light gathered by a lens 1064 in visual capturing device 1160 (e.g., telescope, motion or still camera), illustrated in FIG. 10A, this visual input may comprise ambient light stimulus 1062 captured by, inter alia, device lens 1064. In one or more implementations, such as, for example, retinal encoder 1076 configured for digitized visual input in a processing apparatus 1070 described with respect to FIG. 10B, the visual input 1002_1 of FIG. 10A may comprise digitized pixel values (RGB, CMYK, grayscale, etc.) refreshed at suitable rate. In one such implementation, the digitized pixel stream 1002_1 may bypass the block 1010 and be provided directly to the encoder as the input 1032.

Figure 10B:
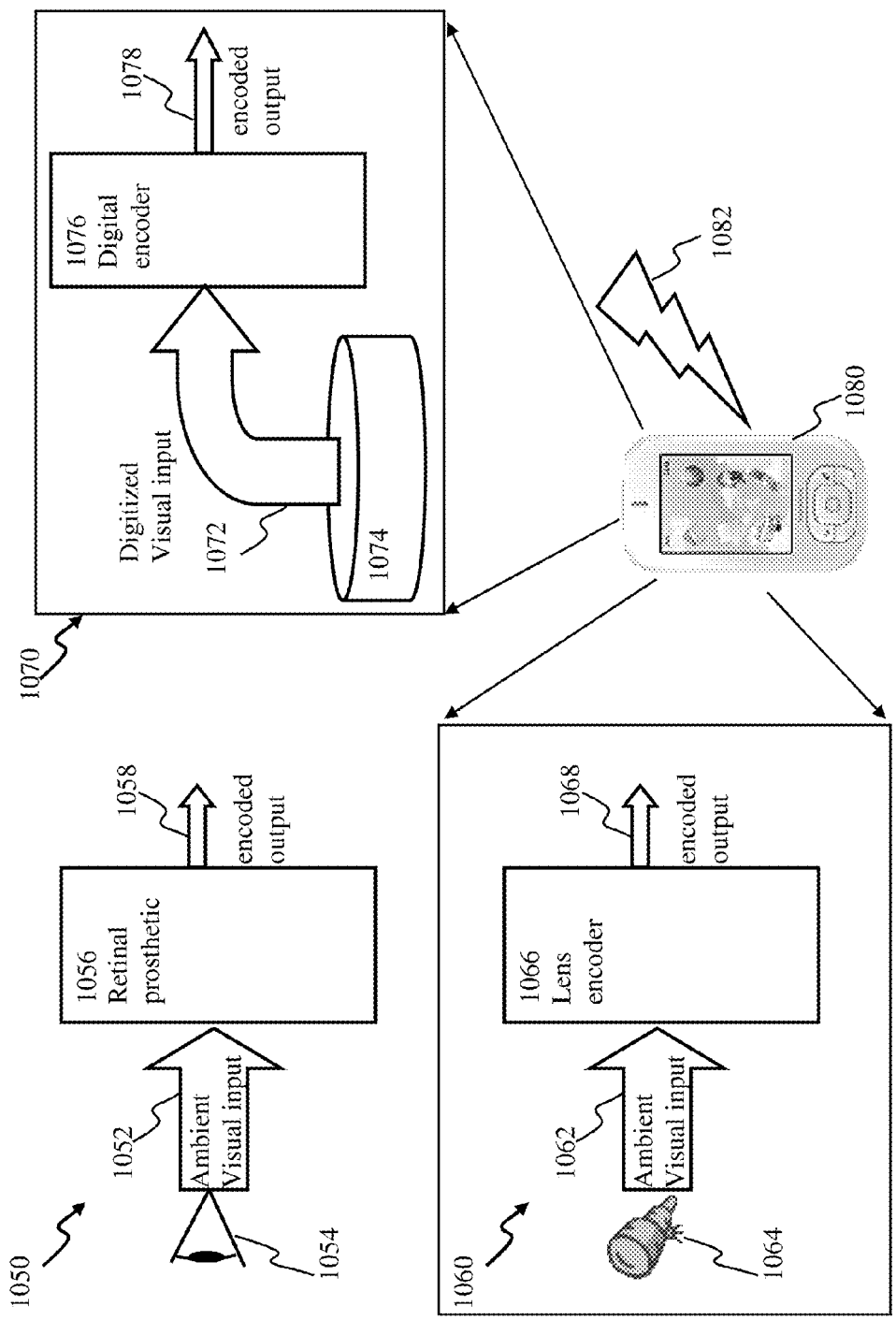
FIG. 10B is a block diagram illustrating retinal encoder of FIG. 10A configured for use in a prosthetic device adapted to process ambient visual signal; and/or processing of digitized visual signals in accordance with one or more implementations.

In some implementations, the input may comprise light gathered by a lens of a portable video communication device 1080 shown in FIG. 10B. In one implementation, the portable device may comprise a smartphone configured to process still and/or video images using diffusively coupled photoreceptive layer described in the resent disclosure. In some implementations, the processing may comprise image encoding and/or image compression, using for example processing neuron layer. In some implementations, encoding and/or compression image may be utilized to aid communication of video data via remote link (e.g., cellular, Bluetooth, WiFi, LTE, and/or other remote links), thereby reducing bandwidth demands on the link. In one or more implementations, compression of up to 1000 may be achieved using encoding methodology of the disclosure.

In some implementations, the input may comprise light gathered by a lens of an autonomous robotic device (e.g., a rover, an autonomous unmanned vehicle, and/or other robotic devices). In one implementation, the robotic device may comprise a camera configured to process still and/or video images using, inter alia, diffusively coupled photoreceptive layer described in the resent disclosure. In some implementations, the processing may comprise image encoding and/or image compression, using for example processing neuron layer. In some implementations, higher responsiveness of the diffusively coupled photoreceptive layer may advantageously be utilized in rover navigation and/or obstacle avoidance.

Returning now to FIG. 10A, the input 1002 may be received and encoded by the encoder 1010 using inter alia, horizontal cone connectivity architecture described in detail supra. In one or more implementations, the encoded output 1032 may be coupled to processing apparatus 1040, configured to perform further processing. In some implementations, the encoded output 1032 may be buffered/stored prior to processing. In some implementations, the processing apparatus 1040 may be embodied in a server that is remote from the encoder 1010.

The processing apparatus 1040 may comprise a neural spiking network configured to encode the input 1032 into output 1020. In one implementation, the output 1020 may comprise spiking output 232 described with respect to FIGS. 2A-2B supra. The network 1040 may comprise one or more layers of neurons 1042, 1049. Spiking neurons 1042_1, 1042_n may be configured to implement different encoder units (PU, rMU, gMU) as described above.

The photodetector output may be provider to the encoder neurons 1042 via one or more connections 1044. The one or more connections 1044 may comprise a weighting parameter configured to configure the input into encoder neurons 1042 in accordance wither encoder type (e.g., PU, MU, etc.). In some implementations, the input configuration may be effectuated by the neurons 1042 via weighting, and/or filtering.

In one or more implementations, the network 1040 may be configured to detect an object and/or object features using, for example, context aided object recognition methodology described in U.S. patent application Ser. No. 13/540,249, filed Jul. 2, 2012, entitled "SENSORY PROCESSING APPARATUS AND METHODS", incorporated supra.

The neurons 1042 may generate spiking output comprising a plurality of pulses that may be transmitted to one or more subsequent neuron layers (e.g., the neuron layer 1049 in FIG. 10A) via one or more connections 1048. Individual ones of the detectors 1049_1, 1049_n may contain logic (which may be implemented as a software code, hardware logic, or a combination of thereof) configured to recognize a predetermined pattern of pulses in the spiking output of the neuron layer 1042, using any of the mechanisms described, for example, in the U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", to produce post-synaptic detection signals transmitted over communication channels 1047.

In one implementation, the detection signals may be delivered to a next layer of the detectors (not shown) for recognition of complex object features and objects, similar to the description found in commonly owned U.S. patent application Ser. No. 13/152,119, filed Jun. 2, 2011, entitled "SENSORY INPUT PROCESSING APPARATUS AND METHODS". In this implementation, subsequent layers of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

Individual ones of the neurons 1042 may generates spiking output signals on communication channels 1048_1, 1048_n (with appropriate latency) that propagate with different conduction delays to the detectors of the upper layer of detectors 1049. The detector cascade of the embodiment of FIG. 10A may contain any practical number of detector nodes and detector banks determined, inter alia, by the software/hardware resources of the detection apparatus and complexity of the objects being detected.

The sensory processing apparatus implementation illustrated in FIG. 10A further may comprise feedback connections 1006, 1046. In some implementations, the connections 1046 may be configured to communicate context information from a detector within the same hierarchy layer, also referred to as the lateral context illustrated by the connection 1046_1 in FIG. 10A. In another variant, connections 1046 may be configured to communicate context information from detectors within other hierarchy layer, also referred to as the context feedback illustrated by the connections 1046_2, 1046_3 in FIG. 10A. In another variant, connection 1006 may be configured to provide feedback to the encoder 1010 thereby facilitating sensory input encoding by the photodetector layer.

FIG. 10B, illustrates various implementations of the sensory encoder 1000 of FIG. 10A useful in one or more visual encoding applications. The processing system 1050 may comprise retinal encoder 1056, adapted for use in a retinal prosthetic device. The encoder 1056 of the prosthetic device 1050 may be disposed in front of the eye retina so that it receives ambient light stimulus 1052 captured through, inter alia, optics of the eye. The encoder 1052 may encode input 1052, in accordance with any of the methodologies described supra. In this implementation, the encoder 1056 may be configured according, for example, to the encoder 240 of FIG. 2B, comprising multiple neuron types configured to implement functionality of different RCG types.

In some implementations, such as, for example, encoding of light gathered by a lens 1064 in visual capturing device 1160 (e.g., telescope, motion or still camera, microscope), illustrated in FIG. 10B, this visual input may comprise ambient light stimulus 1062 captured by, inter alia, device lens 1064.

In some implementations, the lens encoder 1066 of the video capturing device 1060 may be coupled to the output of the device imager (e.g., CCD, or an active-pixel sensor array) so that it receives and encode the input 1062, in accordance with the methodology described supra. In one or more implementations, the retinal encoder 1066 may comprise the pixel array, as illustrated, for example, in U.S. patent application Ser. No. 13/151,477, entitled "RETINAL APPARATUS AND METHODS", incorporated supra.

It will be appreciated by those skilled in the art that the encoder apparatus 1056, 1066 may be also used to process inputs of various electromagnetic wavelengths, such as for example, visible, infrared, ultraviolet light, and/or combination thereof. Furthermore, the retinal encoder of the disclosure may be equally useful for encoding radio frequency, magnetic, electric, or sound wave information.

In one or more implementations, such as, for example, the encoder apparatus 1076 configured for digitized visual input in a processing system 1070 described with respect to FIG. 10B, the visual input 1002_1 and, consequently the input 1002_1 of FIG. 10A may comprise digitized frame pixel values (e.g., RGB, CMYK, grayscale, and/or other pixel values) refreshed at suitable rate. That is, photodetector 101 in FIG. 10A may be bypassed.

The encoder 1076 may comprise neuronal output block (e.g., the block 324 of FIG. 3) configured to encode the cone layer output into spike timing output stream 1078. Such encoding may advantageously effect compression of visual information thereby reducing data processing and transmission load during subsequent data manipulation.

In one or more implementations, the visual capturing device 1160 and/or processing apparatus 1070 may be embodied in a portable visual communications device 1080, such as smartphone, digital camera, security camera, and/or digital video recorder apparatus. The encoder apparatus 1066, 1076 may comprise diffusively coupled photoreceptive array configured using any of the methodologies described herein.

In one or more implementations, the encoder apparatus 1066, 1076 may further comprise the spiking neuron output layer, configured to encode the photoreceptor output into a plurality of spikes. In some implementations the encoding may be used to compress visual input (e.g., 1062, 1072 in FIG. 10B) in order to reduce bandwidth that may be utilized for transmitting encoded output 1068, 1078 by the apparatus 1080 via wireless communications link.

Figure 11A:
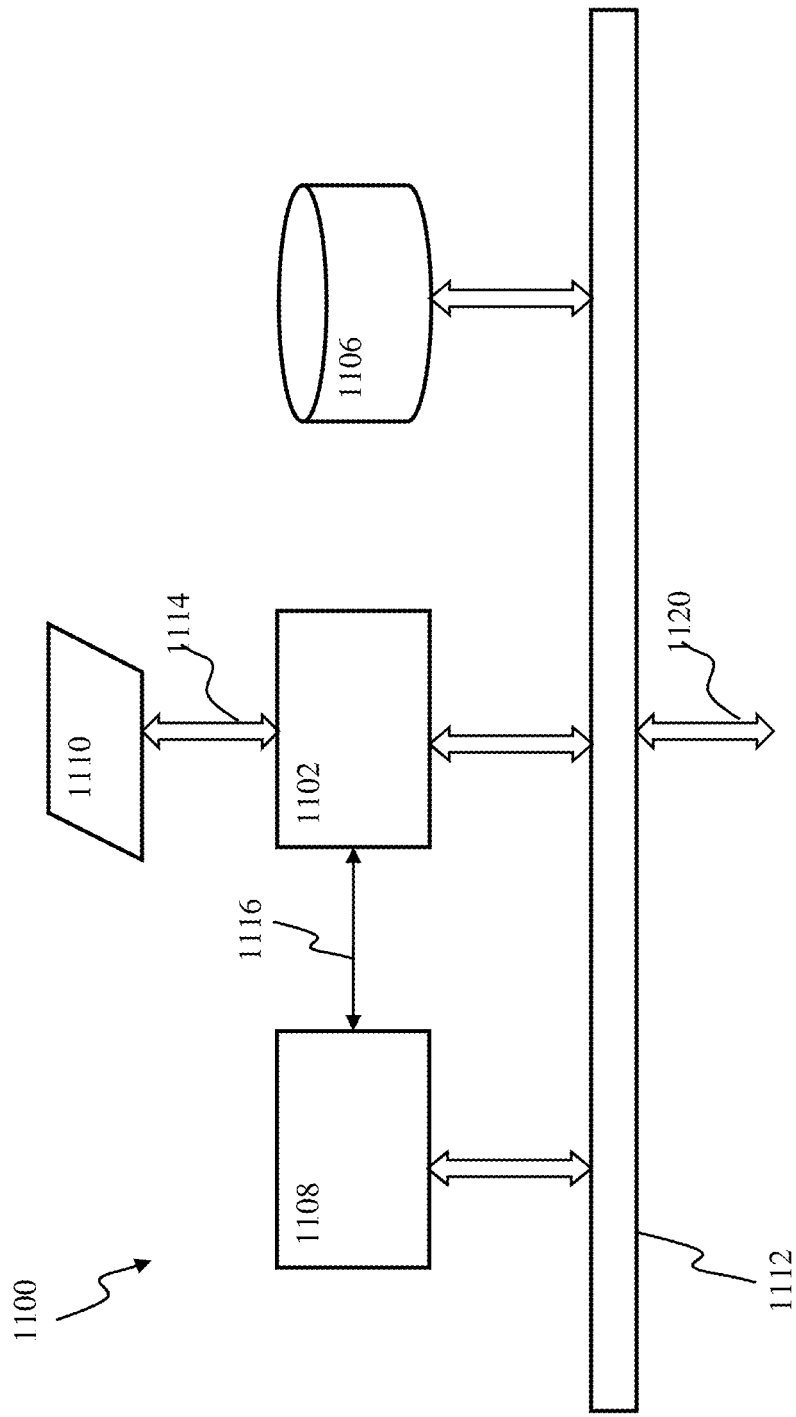
FIG. 11A is a block diagram illustrating computerized system useful with comprising diffusively coupled photoreceptive layer mechanism in accordance with one or more implementations.

One particular implementation of the computerized neuromorphic processing system, for use with sensory processing apparatus described supra, is illustrated in FIG. 11A. The computerized system 1100 of FIG. 11A may comprise an input device 1110, such as, for example, an image sensor, digital image interface, encoder apparatus 230 of FIG. 2A, and/or other components. The input interface 1110 may be coupled to the processing block (e.g., a single or multi-processor block) via the input communication interface 1114. In some implementations, the interface 1114 may comprise wireless interface (e.g., cellular wireless, WiFi, Bluetooth, and/or other wireless interfaces) that enables data transfer to the processor 1102 from remote I/O interface 1100, e.g. One such implementation may comprise central processing apparatus coupled to one or more remote camera devices comprising sensory encoder apparatus of the disclosure.

The system 1100 further may comprise a random access memory (RAM) 1108, configured to store neuronal states and connection parameters and to facilitate synaptic updates. In some implementations, synaptic updates may be performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra In some implementations the memory 1108 may be coupled to the processor 1102 via a direct connection (memory bus) 1116. In one or more implementations the memory 1108 may be coupled to the processor 1102 via a high-speed processor bus 1112). In some implementations, the memory 1108 may be embodies within the processor block 1102.

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, and/or other aspects of spiking neuronal network operation). In one or more implementations, the nonvolatile storage 1106 may be used to store state information of the neurons and connections when, for example, saving/loading network state snapshot, or implementing context switching (e.g., saving current network configuration, which may comprise, inter alia, connection weights and update rules, neuronal states and learning rules, and/or other operations) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., WiFi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces may be similarly applicable to embodiments of the invention including, for example, an LCD/LED monitor, touch-screen input and display device, speech input device, stylus, light pen, trackball, end the likes.

Figure 11B:
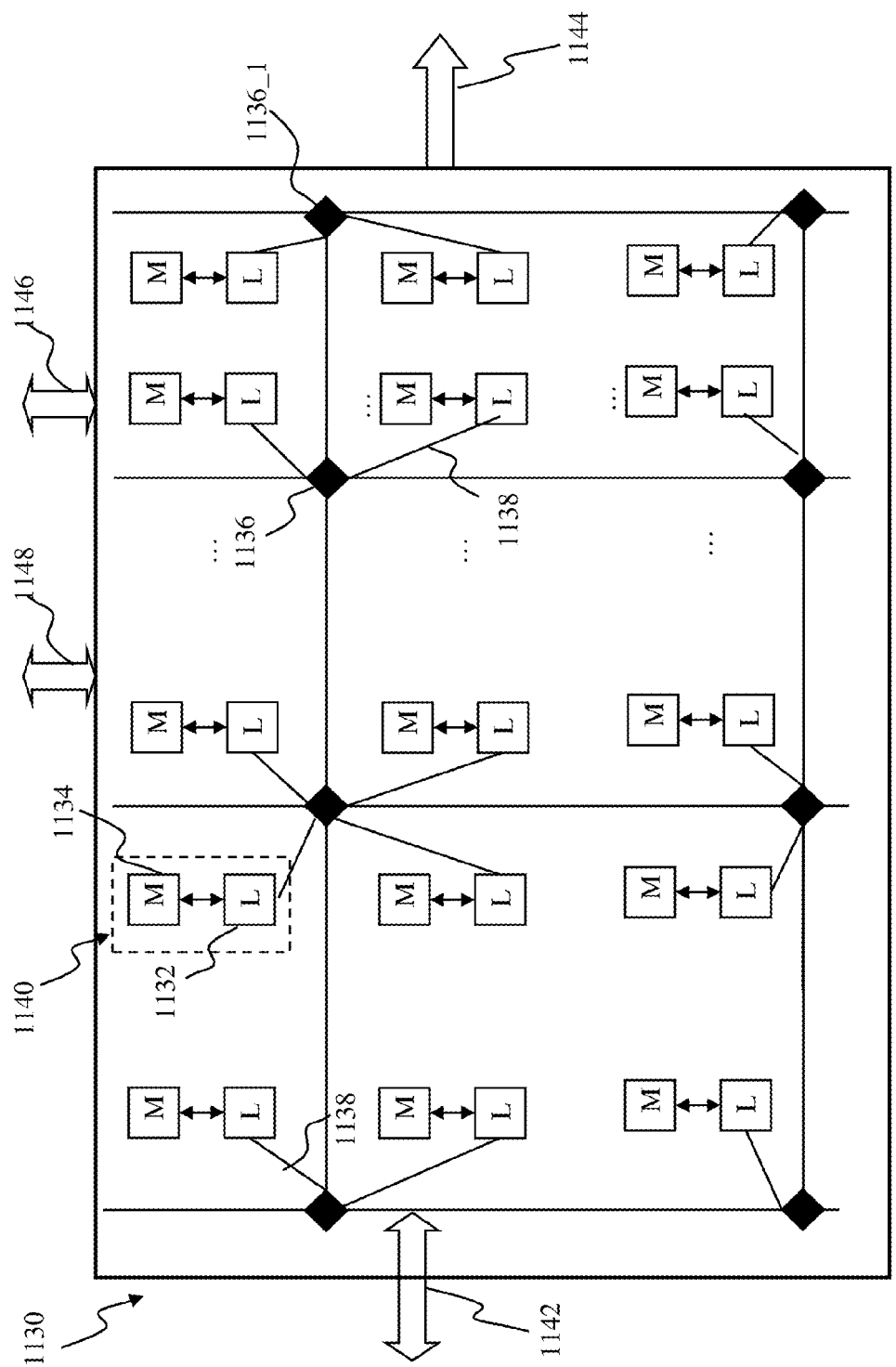
FIG. 11B is a block diagram illustrating neuromorphic computerized system useful with comprising diffusively coupled photoreceptive layer mechanism in accordance with one or more implementations.

FIG. 11B, illustrates one implementation of neuromorphic computerized system configured for use with the encoder apparatus described supra. The neuromorphic processing system 1130 of FIG. 11B may comprise a plurality of processing blocks (micro-blocks) 1140, where individual micro cores may comprise logic block 1132 and memory block 1134, denoted by 'L' and 'M' rectangles, respectively, in FIG. 11B. The logic block 1132 may be configured to implement various aspects spiking neuron encoder, such as the dynamic model of Eqn. 6-Eqn. 9, or neurons 1042 of the processing block 1040. In some implementations, the logic block may implement connection updates (e.g., the connections 1044 in FIG. 10) and/or other tasks relevant to network operation. In some implementations, the update rules may comprise rules spike time dependent plasticity (STDP) updates The memory block may be configured to store, inter alia, neuronal state variables and connection parameters (e.g., weights, delays, I/O mapping) of connections 1138.

One or more micro-blocks 1140 may be interconnected via connections 1138 and routers 1136. In one or more implementations (not shown), the router 1136 may be embodied within the micro-block 1140. As it is appreciated by those skilled in the arts, the connection layout in FIG. 11B is exemplary and many other connection implementations (e.g., one to all, all to all, and/or other connection implementations) may be compatible with the disclosure.

The neuromorphic apparatus 1130 may be configured to receive input (e.g., visual input) via the interface 1142. In one or more implementations, applicable for example to interfacing with computerized spiking retina, or image array. The apparatus 1130 may, in some implementations, provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, and/or other intermediate network operation parameters). In one or more implementations, the apparatus 1130 may also interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety.

Figure 11C:
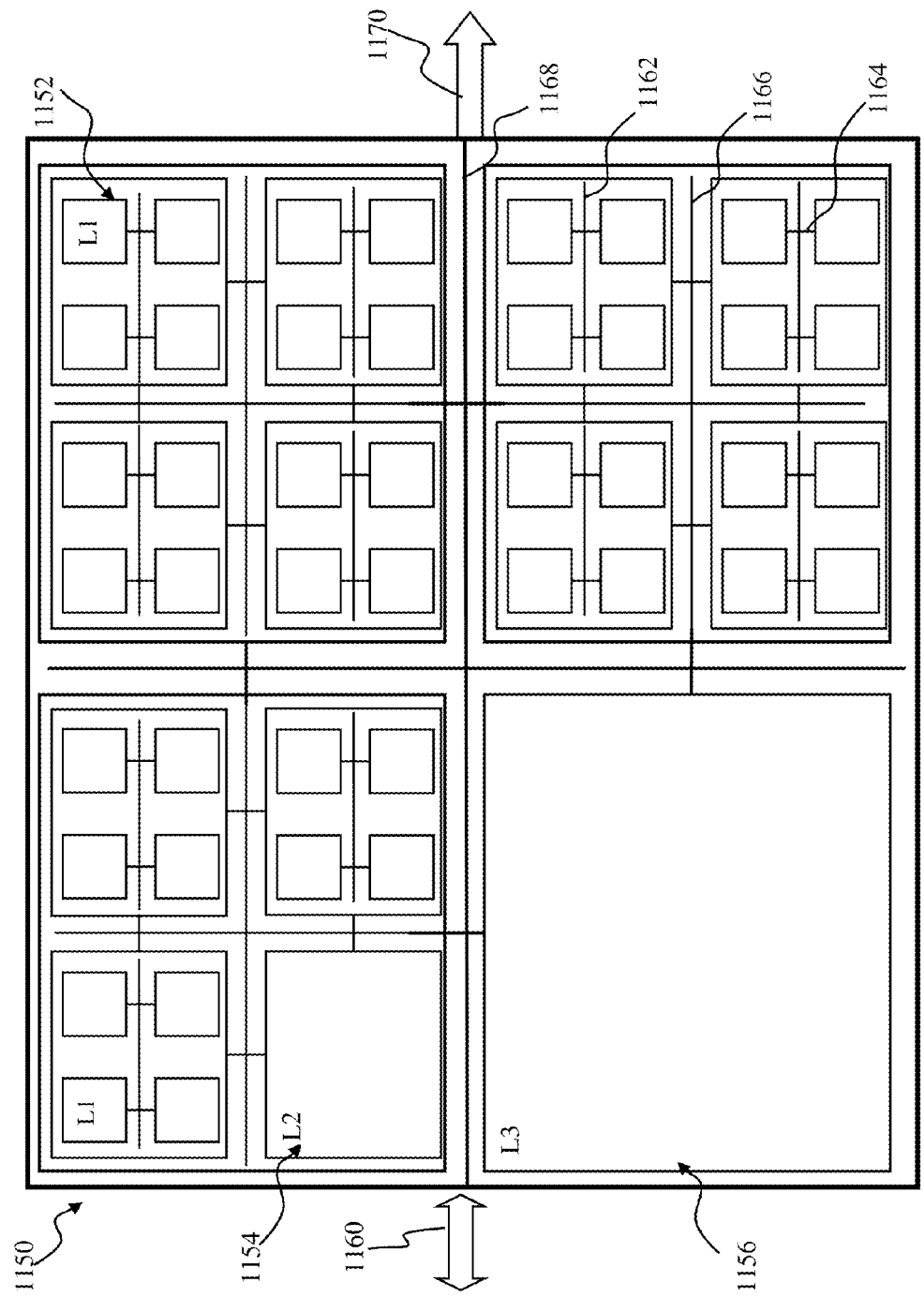
FIG. 11C is a block diagram illustrating hierarchical neuromorphic computerized system architecture useful with retinal encoder apparatus configured in accordance with one or more implementations.

FIG. 11C, illustrates one implementation of cell-based hierarchical neuromorphic system architecture configured to perform encoding of graded sensory input. The neuromorphic system 1150 of FIG. 11C may comprise a hierarchy of processing blocks (cells block) 1140. In some implementations, the lowest level L1 cell 1152 of the apparatus 1150 may comprise logic and memory and may be configured similar to the micro block 1140 of the apparatus shown in FIG. 11B, supra. A number of cell blocks 1052 may be arranges in a cluster 1154 and communicate with one another via local interconnects 1162, 1164. Individual ones of such clusters may form higher level cell, e.g., cell denoted L2 in FIG. 11C. Similarly several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster, and so on. It will be appreciated by those skilled in the arts that hierarchical structure of the apparatus 1150, comprising four cells-per-level may comprise one exemplary implementation and other implementations may comprise more or fewer cells/level and/or fewer or more levels.

Different cell levels (e.g., L1, L2, L3) of the apparatus 1150 may be configured to perform functionality various levels of complexity. In one implementations, different L1 cells may process in parallel different portions of the visual input (e.g., encode different frame macro-blocks), with the L2, L3 cells performing progressively higher level functionality (e.g., edge detection, object detection). In some implementations, different L2, L3, cells may perform different aspects of operating, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10) via the interface 1160. In one or more implementations, applicable for example to interfacing with computerized spiking retina, or image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform the I/O functionality using single I/O block (e.g., the I/O 1160 of FIG. 11C).

The apparatus 1150, in one or more implementations, may interface to external fast response memory (e.g., RAM) via high bandwidth memory interface (not shown), thereby enabling storage of intermediate network operational parameters (e.g., spike timing, and/or other intermediate network operational parameters). In one or more implementations, the apparatus 1150 may also interface to a larger external memory (e.g., flash, or magnetic (hard drive)) via a lower bandwidth memory interface (not shown), in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576, entitled "DYNAMICALLY RECONFIGURABLE STOCHASTIC LEARNING APPARATUS AND METHODS", filed Jun. 4, 2012, incorporated supra.

Various aspects of the disclosure may advantageously be applied to design and operation of apparatus configured to process visual data.

In some implementations, encoding of graded signal into spike output may provide compressed output by a factor of 150 to 1000 times with minimal loss of information relevant for visual processing and, ultimately, for generating appropriate responses to visual stimuli.

In one implementation, comprising multiple neuron types (e.g., PUs, gMUs, gMUs, etc.) the encoder, combined with the diffusively coupled photodetector layer described in U.S. patent application Ser. No. 13/151,477, entitled "RETINAL APPARATUS AND METHODS", may be capable of implementing fully trichromatic vision, as in humans and/or or in non-human primates. Furthermore, the use of large number of optimized encoder unit configurations (e.g., PUs, and MUs) may provide a flexible encoder that may be reconfigured to suit a variety of applications, such as, for example, encoding ambient light, infrared light, light of a particular spectral band, etc., using the same encoder hardware/software platform. In one or more implementations, a portion of the encoder that has previously been configured to encode one aspect of the input may be dynamically reconfigured to encode another property (e.g., luminosity) based upon a condition. By way of a non-limiting example, the chromaticity encoder portion may be turned off and/or switched to encode luminance (and/or infrared) of the input when transitioning from daylight to night data acquisition.

In some implementations, the encoder may be optimized to comprise a reduced set of encoder units comprising lateral unit-to-unit connectivity. Such implementations, may trade off flexibility for increased processing throughput and/or reduced cost, power consumption and/or cost.

The principles described herein may be combined with other mechanism of data encoding in neural networks, as described in, for example, U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", and U.S. patent application Ser. No. 13/152,105 filed on Jun. 2, 2011, and entitled "APPARATUS AND METHODS FOR TEMPORALLY PROXIMATE OBJECT RECOGNITION", incorporated, supra).

Exemplary implementations of the present innovation may be useful in a variety of applications including without limitation visual prosthetics, autonomous and robotic apparatus, and other electromechanical devices requiring video processing functionality. Examples of such robotic devices may include one or more of manufacturing robots (e.g., automotive), military robots, medical robots (e.g. processing of microscopy, x-ray, ultrasonography, tomography), and/or other types of robotic devices. Examples of autonomous vehicles may include one or more of rovers, unmanned air vehicles, underwater vehicles, smart appliances (e.g. ROOMBA®), and/or other autonomous vehicles.

Implementations of the principles of the disclosure may be applicable to video data processing (e.g., compression) in a wide variety of stationary and portable video devices, such as, for example, smart phones, portable communication devices, notebook, netbook and tablet computers, surveillance camera systems, and practically any other computerized device configured to process vision data Implementations of the principles of the disclosure may be further applicable to a wide assortment of applications including computer human interaction (e.g., recognition of gestures, voice, posture, face, and/or other computer human interactions), controlling processes (e.g., an industrial robot, autonomous and/or other vehicles, and/or other processes), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol), and/or other applications.

The disclosure can be used to simplify tasks related to motion estimation, such as where an image sequence may be processed to produce an estimate of the object position and velocity either at individual points in the image or in the 3D scene, or even of the camera that produces the images. Examples of such tasks may include: ego motion, i.e., determining the three-dimensional rigid motion (rotation and translation) of the camera from an image sequence produced by the camera; following the movements of a set of interest points or objects (e.g., vehicles or humans) in the image sequence and with respect to the image plane; and/or other tasks.

In another approach, portions of the object recognition system may be embodied in a remote server, comprising a computer readable apparatus storing computer executable instructions configured to perform pattern recognition in data streams for various applications, such as scientific, geophysical exploration, surveillance, navigation, data mining (e.g., content-based image retrieval), and/or other applications. Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A computer-implemented method of generating a response by a spiking neuron visual encoder apparatus, the method being performed by one or more processors configured to execute computer program modules, the method comprising:

scaling excitability of the spiking neuron based on a value of a statistical parameter of visual input;

adjusting scaled excitability of the spiking neuron in accordance with the visual input;

comparing the adjusted excitability to a threshold; and responsive to the adjusted excitability breaching the threshold, generating the response and adjusting the threshold.

2. The method of claim 1, wherein:
the response comprises a plurality of spikes characterized by a spike rate; and
the scaling and the adjusting are capable of generating the spike rate consistent with the visual input.

3. The method of claim 1, wherein:
the response comprises at least one spike characterized by a spike latency; and
the scaling and the adjusting are capable of generating the spike latency consistent with the visual input.

4. The method of claim 3, wherein:
the statistical parameter is determined based at least on input within an interval prior to occurrence of the response; and
the statistical parameter is capable of characterizing variance of the input within the interval.

5. The method of claim 3, further comprising:
generating another response based on another photodetector input, the other photodetector input, characterized by another value of the statistical parameter configured to scale the other input; and
the other response is characterized another spike rate;
wherein, when the other value is lower than the value, the other spike rate is lower than the spike rate, thereby effectuating the generation of the spike rate consistent with the photodetector input.

6. The method of claim 5, wherein, when the other value is greater than the value,
the other spike rate is greater than the spike rate, thereby effectuating the generation of the spike rate consistent with the photodetector input.

7. The method of claim 1, wherein the scaling comprises multiplying the excitability by a factor based on the statistical parameter.

8. The method of claim 1, wherein:
the neuron response comprises a plurality of spikes characterized by a spike rate;
the visual input comprises a bit stream characterized by first portion having first time scale associated therewith and second portion having second time scale associated therewith, the second time scale being at least twice longer than the first time scale; and
the statistical parameter comprises variance determined based on the second portion.

9. The method of claim 8, wherein:
the plurality of spikes is characterized by at least one an inter-spike interval, and
the second time scale comprises a plurality of the at least one inter-spike intervals.

10. The method of claim 9, wherein:
the at least one inter-spike interval is selected from the range between 1 ms and 1000 ms, inclusive; and
the second time scale is selected from the range between 2 s and 10 s.

11. The method of claim 1, wherein:
the neuron response comprises at least one spikes characterized by a spike latency;
the visual input comprises a bit stream characterized by first portion having first time scale associated therewith and second portion having second time scale associated therewith, the second time scale being at least twice longer than the first time scale; and
the statistical parameter comprises variance determined based on the second portion.

12. The method of claim 1, wherein adjusting the threshold comprises proportional adjustment effectuated by modifying the threshold by a scale factor.

13. The method of claim 1, wherein adjusting the threshold comprises incremental adjustment effectuated by modifying the threshold by an increment value.

14. An image compression apparatus, comprising:
an interface capable of receiving a graded image data at an input time; and
one or more spiking neuron operable in accordance with a dynamic process characterized by an excitability characteristic configured to determine neuron response based on the image data, the one or more neuron capable of implementing:
an adjustment block, capable of modifying a response generation threshold based on the neuron response being generated;
a processing block, capable of determining a parameter associated with one or more image data received over a time period prior to the input time;
a scaling block capable of scaling the image data based on a statistical parameter; and
a response block capable of generating the neuron response when the excitability characteristic is above the threshold;
wherein:
the neuron response comprises one or more spikes; and
the scaling and modifying compress the data into the one or more spikes.

15. The apparatus of claim 14, wherein the adjustment block is capable of modifying the response generation threshold based on the at least a portion of graded image data.

16. The apparatus of claim 14, wherein
the graded image data comprise a plurality of pixels, individual ones of the plurality of pixels characterized by three or more bits of resolution/dynamic range; the data are characterized by first data rate; and
the neuron response comprises compressed output, characterized by second data rate, the second data rate being lower that the first data rate.

17. The apparatus of claim 16, wherein:
the one or more spikes is characterized by a spike rate;
the statistical parameter comprises variance determined from the one or more image data; and
the scaling comprises dividing value associated with individual ones of the plurality of pixel by a factor determined based on the statistical parameter.

18. The apparatus of claim 17, wherein the factor comprises the statistical parameter additively combined with a limit value.

19. The apparatus of claim 17, wherein:
the one or more spikes comprise a binary bit-stream
the graded image data comprise an N-ary bit-stream with N greater than two.

20. The apparatus of claim 17, wherein the statistical parameter is capable of characterizing variance of the input at least within the time period.

21. The apparatus of claim 17, wherein the statistical parameter comprises history of variance of the one or more image data determined based on a solution of an integral equation configured to describe time-dependence of the variance over the time period.

22. A computerized data processing system, comprising:
one or more processors configured to execute computer program modules, wherein execution of the computer program modules causes the one or more processors to implement a spiking neuron network that is configured to encode multi-bit data into binary output by:

evaluating statistics of the multi-bit data;

scaling a portion of the multi-bit data based on the statistics;

adjusting network state based on the scaled portion of the multi-bit data; and generating the binary output based on a comparison of the adjusted state with a threshold;

wherein the binary output is characterized by a lower bit-rate compared to the multi-bit input.

23. The system of claim 22, wherein:

the multi-bit data comprise analog data are characterized by three or more bits of dynamic range; and the binary output comprises one or more spikes characterized by two bits of dynamic range.

24. The system of claim 22, wherein:

the multi-bit data comprise one or more pixels associated with a digital image, individual ones of the one or more pixels characterized by three or more bits of dynamic range.

25. The system of claim 22, wherein:

the binary output comprises one or more spikes; and individual ones of the one or more spikes characterized by a binary one bit value.

* * * * *